(12) United States Patent
Yadlapalli et al.

(10) Patent No.: US 12,556,132 B2
(45) Date of Patent: Feb. 17, 2026

(54) QUICK LOCK MODULE RAIL FOR SOLAR TRACKER

(71) Applicant: Nextracker LLC, Fremont, CA (US)

(72) Inventors: Venkata Nitin Mythreya Yadlapalli, Nellore (IN); Bhanu Rekha Bandhakavi, Hyderabad (IN); Jitendra Morankar, Hyderabad (IN)

(73) Assignee: NEXTRACKER LLC, Fremont, CA (US)

( * ) Notice: Subject to any disclaimer, the term of this patent is extended or adjusted under 35 U.S.C. 154(b) by 110 days.

(21) Appl. No.: 18/332,107

(22) Filed: Jun. 9, 2023

(65) Prior Publication Data

US 2023/0402963 A1 Dec. 14, 2023

Related U.S. Application Data

(60) Provisional application No. 63/350,954, filed on Jun. 10, 2022.

(51) Int. Cl.
*H02S 30/10* (2014.01)
*F16B 35/06* (2006.01)
*F16M 13/02* (2006.01)
*H02S 20/32* (2014.01)

(52) U.S. Cl.
CPC .............. *H02S 30/10* (2014.12); *F16B 35/06* (2013.01); *F16M 13/02* (2013.01); *H02S 20/32* (2014.12)

(58) Field of Classification Search
None
See application file for complete search history.

(56) References Cited

U.S. PATENT DOCUMENTS

| | | | |
|---|---|---|---|
| 9,837,955 B1 | 12/2017 | Schuit et al. | |
| 2011/0100434 A1 | 5/2011 | Van Walraven | |
| 2011/0138585 A1 | 6/2011 | Kmita et al. | |
| 2014/0263902 A1* | 9/2014 | Conley | H02S 20/00 29/428 |
| 2020/0304057 A1* | 9/2020 | Suan | F24S 25/12 |
| 2020/0382049 A1* | 12/2020 | Wares | H02G 3/081 |
| 2021/0249986 A1* | 8/2021 | Von Deylen | F16B 39/10 |
| 2023/0396208 A1* | 12/2023 | Pedlar | F24S 25/33 |

OTHER PUBLICATIONS

International Search Report and Written Opinion of the International Application No. PCT/US2023/024924, mailed Sep. 21, 2023, 14 pg.

* cited by examiner

*Primary Examiner* — Ryan S Cannon
(74) *Attorney, Agent, or Firm* — Fredrikson & Byron, P.A.

(57) ABSTRACT

A coupling system for use with a solar tracker includes a support rail defining opposed top and bottom surfaces, the top surface configured to support a portion of a solar module, and a fastening assembly operably coupled to a portion of the support rail, the fastening system including a retaining bolt having an elongated head including opposed top and bottom surfaces extending between opposed first and second end portions, wherein the bottom surface of the elongated head is offset from the top surface of the support rail to define a gap, the gap configured to selectively receive a portion of a solar module therein.

10 Claims, 21 Drawing Sheets

QUICK LOCK MODULE RAIL FOR SOLAR TRACKER

CROSS REFERENCE TO RELATED APPLICATION

This application claims the benefit of U.S. Provisional Application No. 63/350,954, filed Jun. 10, 2022, the content of which is hereby incorporated by reference in its entirety.

TECHNICAL FIELD

The present disclosure relates to solar power generation systems, and more particularly, to clamps and clamping systems for securing solar modules to a support structure.

BACKGROUND

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Coupling the numerous solar modules to the support structure requires a significant number of clamps or other mechanisms, each requiring a significant number of fasteners, driving up the cost of manufacturing each mechanism. As can be appreciated, assembling each of these mechanisms and securely tightening each fastener requires an enormous amount of time, contributing to increased cost and longer assembly time. The present disclosure seeks to address the shortcomings of prior tracker systems.

SUMMARY

In accordance with an aspect of the present disclosure, a coupling system for use with a solar tracker includes a support rail defining opposed top and bottom surfaces, the top surface configured to support a portion of a solar module, and a fastening assembly operably coupled to a portion of the support rail, the fastening system including a retaining bolt having an elongated head including opposed top and bottom surfaces extending between opposed first and second end portions, wherein the bottom surface of the elongated head is offset from the top surface of the support rail to define a gap, the gap configured to selectively receive a portion of a solar module therein.

In aspects, the coupling system may include a spring arm, the spring arm operably coupled to the bottom surface of the support rail and including an upturned flange that is configured to extend pas the top surface of the support rail.

In certain aspects, a portion of the solar module may include a retaining groove defined therethrough, the retaining groove configure to receive a portion of the elongated head of the retaining bolt therein.

In other aspects, the upturned flange of the spring arm may be configured to be received within the retaining groove when the solar module is in the second position, such that the elongated head and the upturned flange cooperate to inhibit movement of the solar module relative to the support rail.

In certain aspects, the coupling system may include a biasing element, the biasing element interposed between the bottom surface of the elongated head and the top surface of the support rail to bias the elongated head away from the top surface of the support rail.

In aspects, the biasing element may be configured to be compressed to adjust a distance between the bottom surface of the elongated head and the top surface of the support rail.

In other aspects, the coupling system may include a nut threadably engaged to a portion of the retaining bolt, the nut configured to compress the biasing element when rotated in a first direction and enable the biasing element to extend when rotated in a second, opposite direction.

In aspects, the retaining bolt may include a boss disposed on the bottom surface of the elongated head, the boss extending from the bottom surface and terminating at a lower surface, the lower surface abutting a portion of the top surface of the support rail to define the gap.

In certain aspects, the elongated head may define a racetrack profile.

In accordance with another aspect of the present disclosure, a fastening assembly for use with a solar module includes a retaining bolt, the retaining bolt including an elongated head including opposed top and bottom surface extending between opposed first and second end portions, and a boss disposed on a portion of the bottom surface of the elongated head and disposed adjacent one o the first and second end portions, wherein the bottom surface of the elongated head is offset from the lower surface of the boss to define a gap, the gap configured to selectively receive a portion of the solar module therein.

In aspects, the fastening assembly may include a spring arm, the spring arm configured to selectively engage a portion of a solar module.

In other aspects, the fastening assembly may include a biasing element, the biasing element disposed adjacent the bottom surface of the elongated head and configured to be compressed to alter a dimension of the gap.

In certain aspects, the boss may extend from the bottom surface of the elongated head and terminate at a lower surface, the distance between the bottom surface of the elongated head and the lower surface of the boss defining the dimension of the gap.

In other aspects, the elongate head may define a racetrack profile.

In accordance with another aspect of the present disclosure, a method of coupling a solar module to a support rail includes aligning a retaining groove defined on a portion of the a solar module with an elongated head of a retaining bolt, wherein a lower surface of the retaining bolt is offset relative to an upper surface of a support rail to define a gap therebetween, advancing the solar module towards the upper surface of the support rail such that a portion of the elongated head of the retaining bolt is received within the retaining groove, and advancing the solar module in a first, longitudinal direction to cause a portion of the solar module to be received within the gap to selectively retain the solar module to the support rail.

In aspects, advancing the solar module towards the upper surface of the support rail may include causing a portion of the solar module to abut a portion of an upturned flange of a spring arm and cause the upturned flange to be compressed, the spring arm operably coupled to a portion of the support rail.

In certain aspects, advancing the solar module in the first longitudinal direction cause the upturned flange of the spring arm to uncompress and be received within a portion of the retaining groove.

In other aspects, the method may include rotating a nut threadably engaged to a portion of the retaining bolt in a first direction to alter a dimension of the gap.

In certain aspects, rotating the nut in the first direction may include rotating the nut in the first direction to compress a biasing element interposed between the lower surface of the retaining bolt and the upper surface of the support rail to alter a dimension of the gap.

BRIEF DESCRIPTION OF THE DRAWINGS

Various aspects and features of the present disclosure are described hereinbelow with reference to the drawings, wherein.

DETAILED DESCRIPTION

Figure 1:
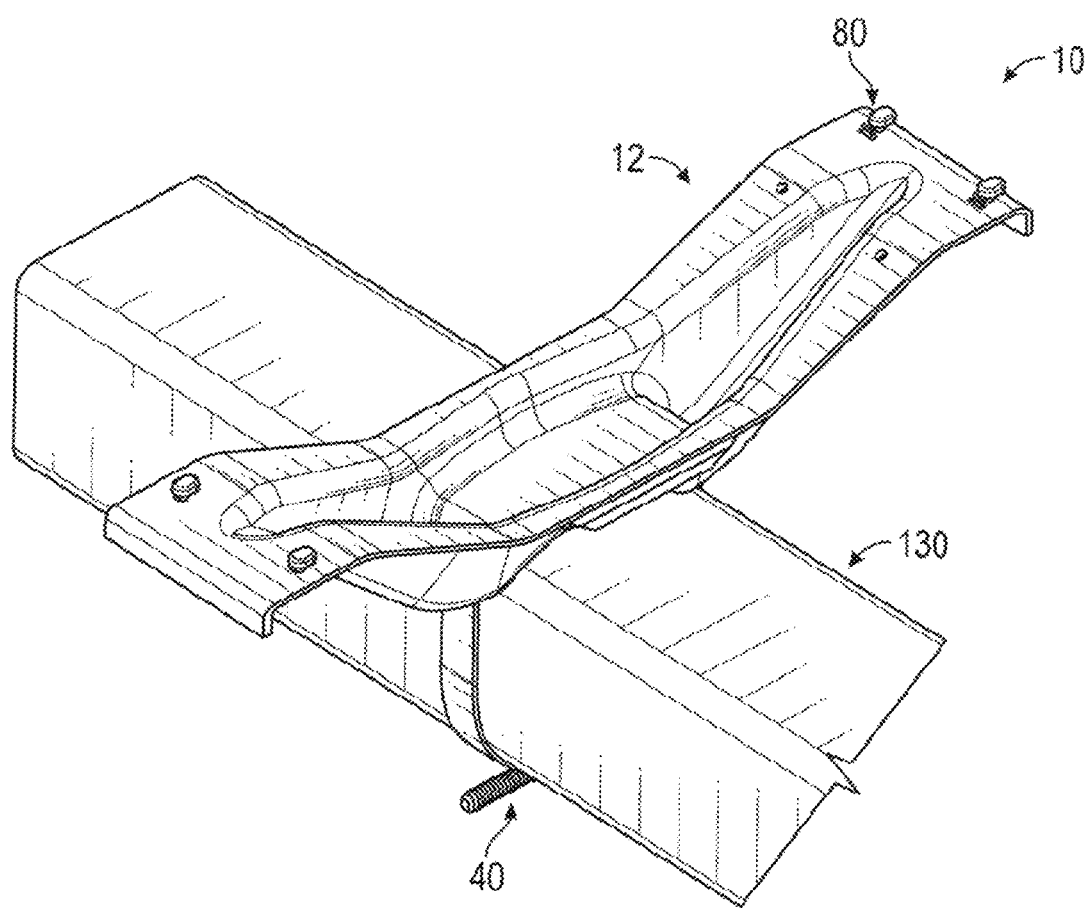
FIG. 1 is a perspective view of a clamp assembly provided in accordance with the present disclosure illustrated coupled to a torque tube.
Figure 2:
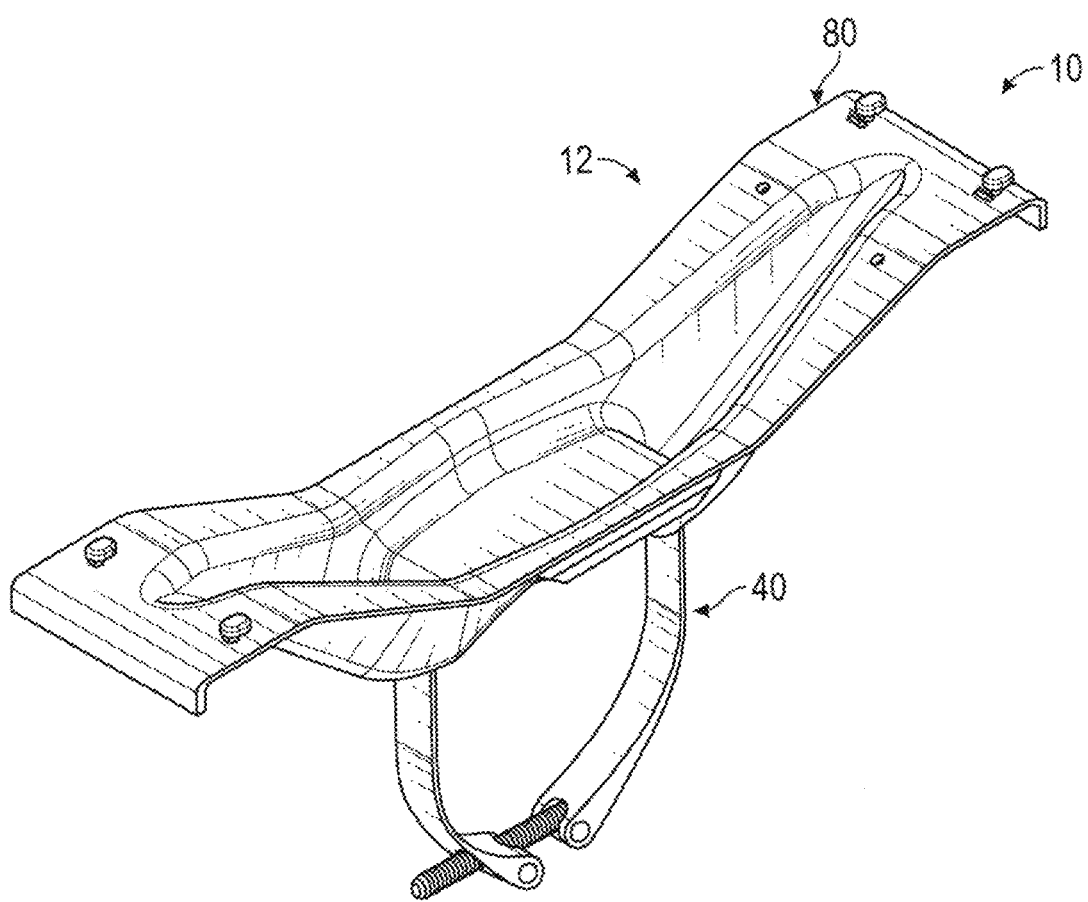
FIG. 2 is a perspective view of the clamp assembly of FIG. 1.
Figure 3:
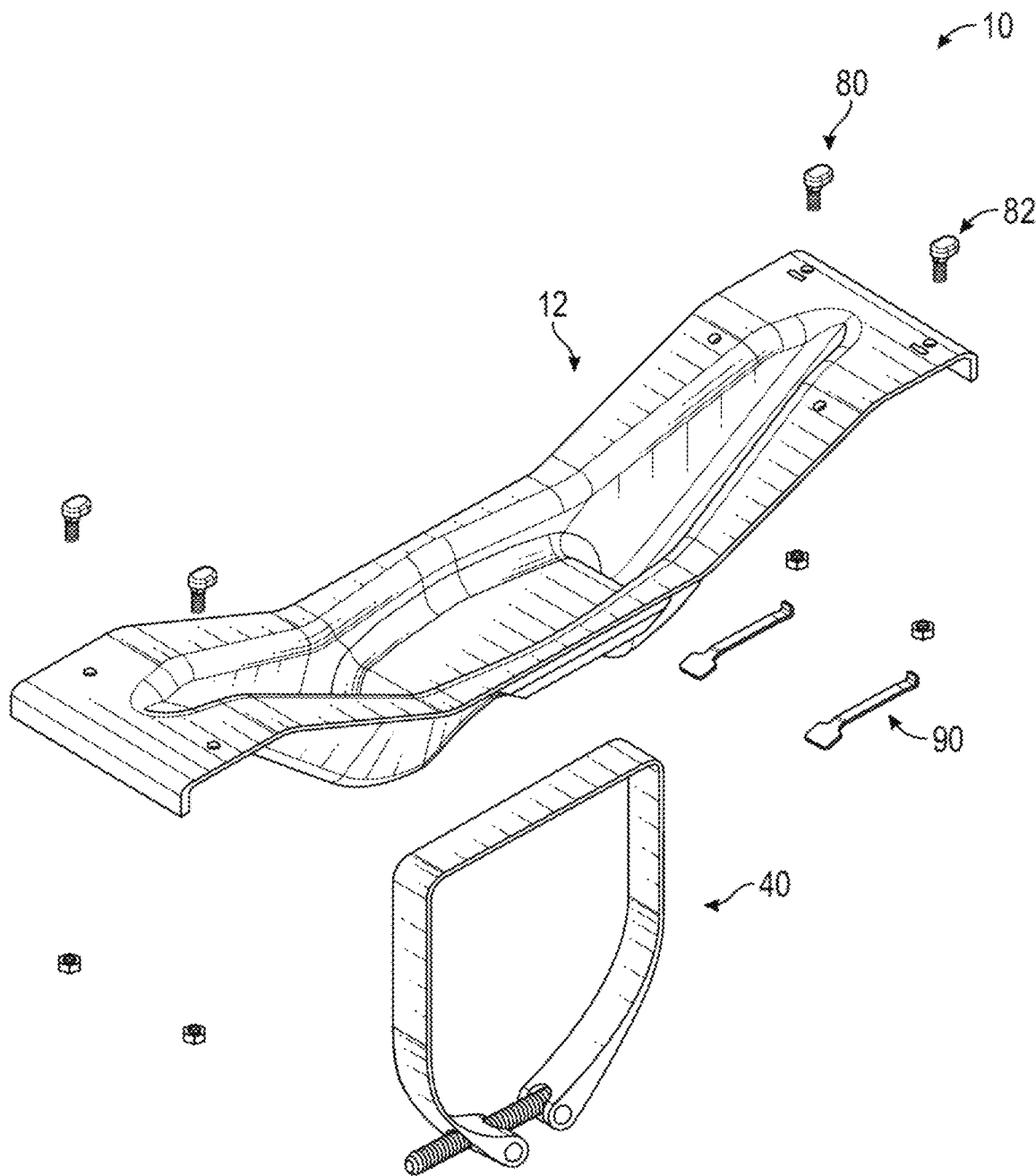
FIG. 3 is an exploded view of the clamp assembly of FIG. 1.

The present disclosure is directed to a coupling system for use with a solar tracker. The coupling system described herein reduces the number of fasteners required to couple solar modules to a torque tube and reduces the amount of labor required to install and/or adjust solar modules on the torque tubes. The coupling system includes a support rail, a strap assembly, and a fastening assembly. The support rail is configured to be selectively secured to a torque tube of a solar tracker via the strap assembly. In this manner, the strap assembly is operably coupled to the support rail and includes a strap that is configured to be clamped or otherwise selectively secured to the torque tube by tightening a bolt and trunnion assembly. The support rail includes a spring arm that is operably coupled to a lower surface and includes an upturned flange that protrudes past an upper surface of the support rail. The spring arm is formed from a resilient material such that the upturned flange may be selectively depressed flush with or below the upper surface of the support rail and return to its original position once a force is removed therefrom.

The support rail also includes a plurality of retaining bolts having a generally "L" shaped profile. In this manner, each retaining bolt includes an elongated head with a boss defined on a lower surface thereof. The boss is disposed generally concentric with an arcuate end portion of the elongated head such that the boss is offset from a center portion of the elongated head. The boss includes an outer surface that is generally flush with an outer surface of the elongated head and includes a lower surface that is configured to abut the upper surface of the support rail. As can be appreciated, by abutting the upper surface of the support rail, the length of the boss defines a gap between the lower surface of the elongated head and the upper surface of the support rail that is configured to selectively receive a portion of a solar module therein. In embodiments, the boss may include an outer dimension that is less than an outer dimension of the elongated head such that the boss may be received within a retaining slot formed within a portion of the solar module. In this manner, a biasing element may be disposed over the boss such that the biasing element is interposed between the lower surface of the elongated head and the upper surface of the rail to bias the elongated head in a direction away from the upper surface of the rail. The boss includes a threaded shank disposed thereon that is configured to threadably engage a nut, which when rotated in a first direction, causes the lower surface of the elongated head to be drawn towards the upper surface of the support rail and compress the biasing element, and when rotated in a second direction, enables the biasing element to bias the elongated head away from the upper surface of the support rail to adjust the dimension of the gap to accommodate differing thicknesses of the solar module.

In operation, the solar module is disposed over the elongated heads of the plurality of retaining bolts such that the elongated heads are generally aligned with respective retaining slots of the solar module. The solar module is advanced towards the upper surface of the support rail such that the elongated heads are received within the retaining slots and a bottom surface of the solar module abuts a portion of the upturned flanges of the spring arms. Continued advancement of the solar module towards the upper surface of the support rail causes the upturned flanges to be depressed until the bottom surface of the solar module abuts the upper surface of the support rail. At this point, the solar module is drawn or otherwise slid in a longitudinal direction such that a portion of the solar module is received within the gap formed between the lower surface of the elongated heads and the upper surface of the support rail. Continued sliding of the solar module in the longitudinal direction causes the upturned flanges of the spring arms to align with a portion of the retaining slots and be received therein to inhibit longitudinal movement of the solar module relative to the support rail. As can be appreciated, by capturing a portion of the solar module within the gap, in cooperation with the upturned flanges of the spring arms, the solar module is inhibited from moving relative to the support rail, thereby coupling the solar module to the torque tube of the solar tracker.

In aspects where the biasing element is interposed between the lower surface of the elongated heads and the upper surface of the support rail, once the portion of the solar module is received within the gap, the nut is rotated in the first direction to clamp or otherwise secure the retaining bolts to the solar module to inhibit movement of the solar module relative to the support rail. As can be appreciated, when the biasing element is utilized, the use of the spring arms may be optional.

In embodiments, the retaining bolts and spring arms may be received within elongated slots defined within a portion of the support rail that are defined transverse to a longitudinal axis. In this manner, the location of the retaining bolts and the spring arms may be adjusted to accommodate misalignment and/or differing solar module designs. The assembly process is substantially similar to that described above, in that once the portion of the solar module is received within the gap, the nut is tightened to fix the location of the retaining bolts relative to the support rail and couple the solar module to the support rail.

In another embodiment, the retaining bolts include an elongated boss defined on the lower surface of the elongated head to engage a portion of a biasing element interposed between the lower surface of the elongated head and the upper surface of the support rail. The biasing element includes a generally circular center portion and upper and lower arms. The upper arm defines a first portion extending generally tangentially from an outer circumference of the center portion and a second portion defined generally orthogonal to the first portion that is configured to engage the elongated boss of the retaining bolt. The lower arm extends generally tangentially from the outer circumference of the center portion and defined an interior angle relative to the first portion of the upper arm that is generally less than 90 degrees. The lower arm includes an downturned tab defined on an end portion thereof that is configured to be received within an aperture defined through a portion of the support rail to rotatably support the biasing element thereon. The support rail defines a keyhole having a circular portion and a notch defined through an outer circumference thereof. The keyhole is configured to rotatably receive the threaded shank of the retaining bolt such that the biasing element biases the elongated head of the retaining bolt in a first, open direction.

A retaining washer includes a generally circular center portion having four upturned flanges disposed on an outer circumference thereof generally 90 degrees apart from one another. Three of the upturned flanges are disposed at a diagonal angle relative to the center portion and extending outwards from a center thereof. A fourth upturned flange is disposed generally orthogonal to the center portion and includes a length that is greater than that of the remaining three upturned flanged. The retaining washer is interposed between the bottom surface of the support rail and the nut, such that as the nut is rotated in the first direction, the nut urges the support washer towards the bottom surface of the support rail such that the fourth upturned flange is received through the notch of the keyhole. Continued rotation of the nut in the first direction causes the fourth upturned flange to extend past the upper surface of the support rail and inhibit rotation of the elongated head of the retaining bolt to its original location when it has been rotated.

In operation, each of the retaining bolts are placed in their initial portion where the elongated heads extend in a direction that is parallel to a longitudinal axis defined through the support rail. The solar module is places on the upper surface of the support rail such that upturned flanges defined on the upper surface of the support rail are received within corresponding bores defined within a portion of the solar module to generally locate the solar module relative to the support rail. With the solar module resting on the upper surface of the support rail, the nuts are rotated in the first direction, which causes the retention bolt to act against the biasing element and rotate the elongated heads towards the solar module to capture a portion of the solar module within the gap formed between the lower surface of the elongated heads and the upper surface of the support rail until a portion of the elongated heads abut a portion of the upturned flanges to inhibit further rotation of the retaining bolts. Continued rotation of the nut causes the retaining washer to deform or otherwise flatten against the bottom surface of the support rail and the fourth upturned flange of the retaining washer to extend pas the upper surface of the support rail. The position of the fourth upturned flange relative to the elongated heads inhibits the biasing element from returning the elongated heads to their original position and inhibits rotation of the elongated heads to their original position in the event the nut loosens. Further rotation of the nuts causes the lower surface of the elongated heads to abut or otherwise clamp against the solar module to inhibit movement of the solar module relative to the support rail. These and other aspects of the present disclosure will be described in detail herein below with reference to the drawings.

Referring now to the drawings, FIGS. 1-19 illustrate a clamp assembly for use with a solar module generally identified by reference numeral 10. The clamp assembly 10 includes a support rail 12, a strap assembly 40, and a fastening assembly 80.

Figure 4:
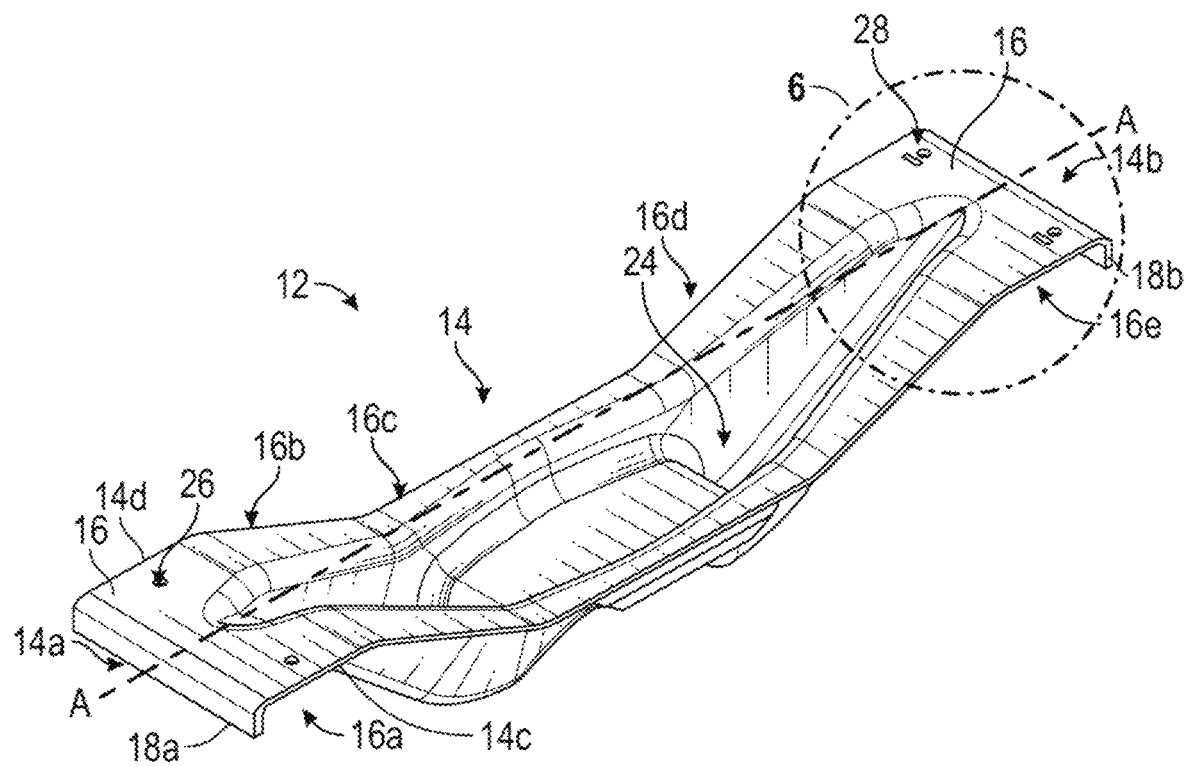
FIG. 4 is a perspective view of a support rail of the clamp assembly of FIG. 1.
Figure 5:
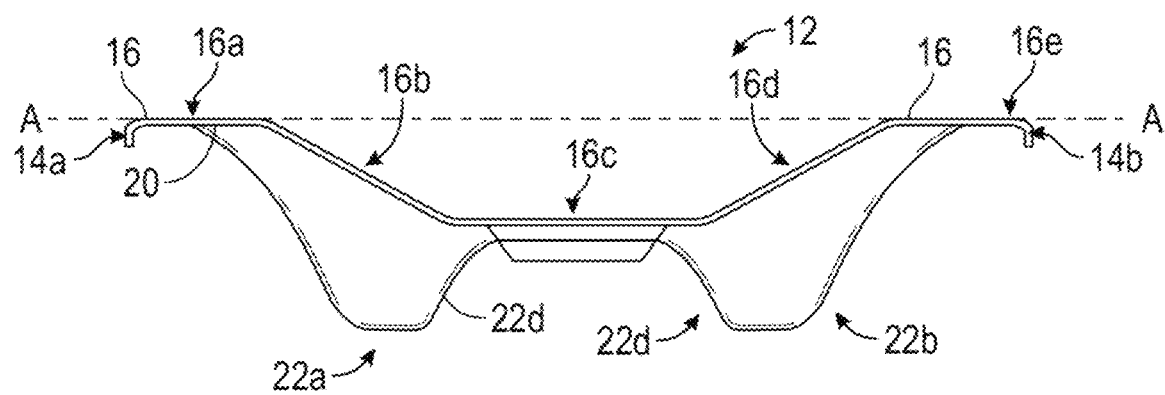
FIG. 5 is an elevation view of the support rail of FIG. 4.
Figure 6:
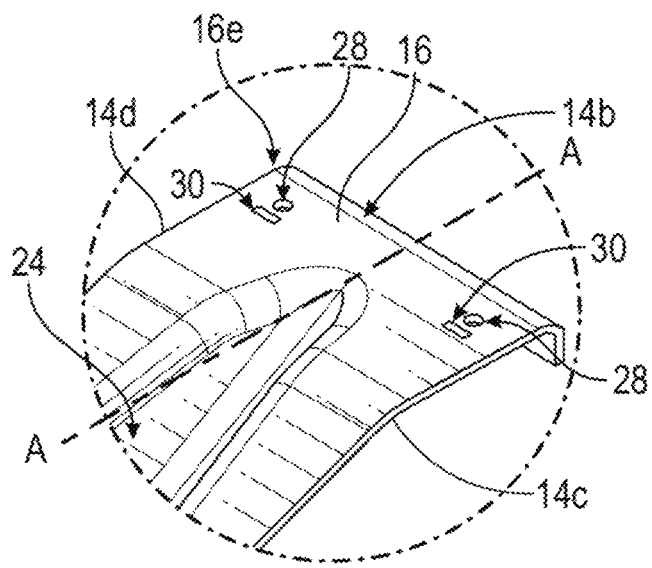
FIG. 6 is an enlarged view of the area of detail indicated in FIG. 4.

With reference to FIGS. 4-6, the support rail 12 includes an elongate body 14 extending between opposed first and second end portions 14a and 14b, respectively, defining a longitudinal axis A-A. It is envisioned that the elongate body 14 may include any suitable length (e.g., dimension extending along the longitudinal axis A-A between the first and second end portions 14a, 14b) depending upon the design needs of the clamp assembly 10. The elongate body 14 includes opposed side surfaces 14c and 14d extending between each of the first and second end portions 14a, 14b and an upper surface 16 extending between each of the first and second end portions 14a, 14b and the opposed side surfaces 14c, 14d. The upper surface 16 defines a first planar portion 16a adjacent the first end portion 14a and extending towards the second end portion 14b. The first planar portion 16a transitions to a first sloped portion 16b in a direction towards the second end portion 14b. The first sloped portion 16b forms an angle relative to the first planar portion 16a such that the first sloped portion 16b extends in a downward direction (e.g., a direction that is opposite to a direction in which the upper surface 16a is facing). The first sloped portion 16b transitions to a center planar portion 16c extending in a direction towards the second end portion 14b that is generally parallel with the first planar portion 16a but offset in a downward direction relative thereto, although it is contemplated that the center planar portion 16c may define any suitable angle relative to the first planar portion 16a and/or the first sloped portion 16b depending upon the design needs of the clamp assembly 10.

The center planar portion 16c transitions to a second sloped portion 16d extending in a direction towards the second end portion 14b along the longitudinal axis A-A. The second sloped portion 16d extends in an upward direction (e.g., away from the center planar portion 16c in the same direction in which the upper surface 16a is facing) and defines an angle relative to the center planar portion 16c that is generally the same as an angle formed between the first sloped portion 16b and the center planar portion 16c, although it is contemplated that the second sloped portion 16d may define any suitable angle relative to the center planar portion 16c depending upon the design needs of the clamp assembly 10. The second sloped portion 16d transitions to a second planar portion 16e that is generally parallel with and coplanar with the first planar portion 16a, although it is contemplated that the second planar portion 16e may define any suitable angle relative to the first planar portion 16a and be disposed at any distance relative to the first planar portion 16a (e.g., higher or lower than the first planar portion 16a). The second planar portion 16e extends towards and terminates at the second end portion 14b. The elongate body 14 includes a pair of downturned flanges 18a and 18b disposed adjacent to each of the first and second end portions 14a, 14b, respectively. The pair of downturned flanges 18a, 18b extend in a direction away from the first and second planar portions 16a, 16e (e.g., towards the center planar portion 16c).

The elongate body 14 defines a lower surface 20 (FIG. 5) disposed in juxtaposed relation to the upper surface 16 and extends between each of the first and second end portions 14a, 14b and the opposed side surfaces 14c, 14d, respectively. The lower surface 20 defines a shape that generally conforms to the shape of the upper surface 16 except that the lower surface 20 includes a pair of protuberances 22a and 22b disposed thereon in spaced apart relation to one another such that a gap 22c is defined therebetween. The pair or protuberances 22a, 22b extend in a downward direction (e.g., in the same direction in which the lower surface 20 is facing) and in cooperation with the gap 22c, forms a generally inverted saddle or kidney bean configuration that is configured to selectively receive a portion of a torque tube 130 (FIGS. 1 and 3) therein. In this manner, the gap 22c includes an inner surface 22d extending between the pair of protuberances 22a, 22b that is configured to abut or otherwise contact a portion of a torque tube 130 received within the gap 22c, as will be described in further detail hereinbelow. As can be appreciated, the gap 22c is configured to receive a torque tube 130 therein having any suitable profile, such as circular, hexagonal, D-shaped, oval, amongst others. The upper surface 16 includes a cavity 24 defined therein that generally conforms to the profile of the lower surface 20 and the pair of protuberances 22a, 22b. It is envisioned that the support rail 12 may be formed from any suitable material, such as steel, aluminum, a polymer, a composite, etc. and may be formed using any suitable process, such as machining, additive manufacturing, stamping, hydroforming, amongst others.

The first planar portion 16a of the elongate body 14 includes a first pair of bores 26 (FIG. 4) defined therethrough and extending through the lower surface 20 adjacent the first end portion 14a and each of the opposed side surfaces 14c, 14d (e.g., in spaced apart relation transverse to the longitudinal axis A-A). The first pair of bores 26 is configured to selectively receive a first pair of retaining bolts 82 of the fastening assembly 80, as will be described in further detail hereinbelow. The second planar portion 16e of the elongate body 14 includes a second pair of bores 28 defined through the upper and lower surfaces 16, 20 adjacent the second end portion 14b and each of the opposed side surfaces 14c, 14d (e.g., in spaced apart relation transverse to the longitudinal axis A-A). The second pair of bores 28 is configured to selectively receive a second pair of retaining bolts 82, as will be described in further detail hereinbelow. The second planar surface 16e of the elongate body 14 includes a pair of slots 30 defined therethrough and extending through the lower surface 20. The pair of slots 30 is disposed adjacent the second pair of bores 28 at a location such that the second pair of bores 28 is interposed between the pair of slots 30 and the second end portion 14b. The pair of slots 30 each extend in a direction that is generally transverse to the longitudinal axis A-A (e.g., in a direction extending between the opposed side surfaces 14c, 14d). Each of the pair of slots 30 is configured to selectively receive a portion of a respective spring arm 90 of the fastening assembly 80, as will be described in further detail hereinbelow. Although described in detail hereinabove, one having ordinary skill in the art would recognize that any suitable support rail capable of being used with the strap assembly 40 and fastening assembly 80 described hereinbelow may be utilized.

Figure 7:
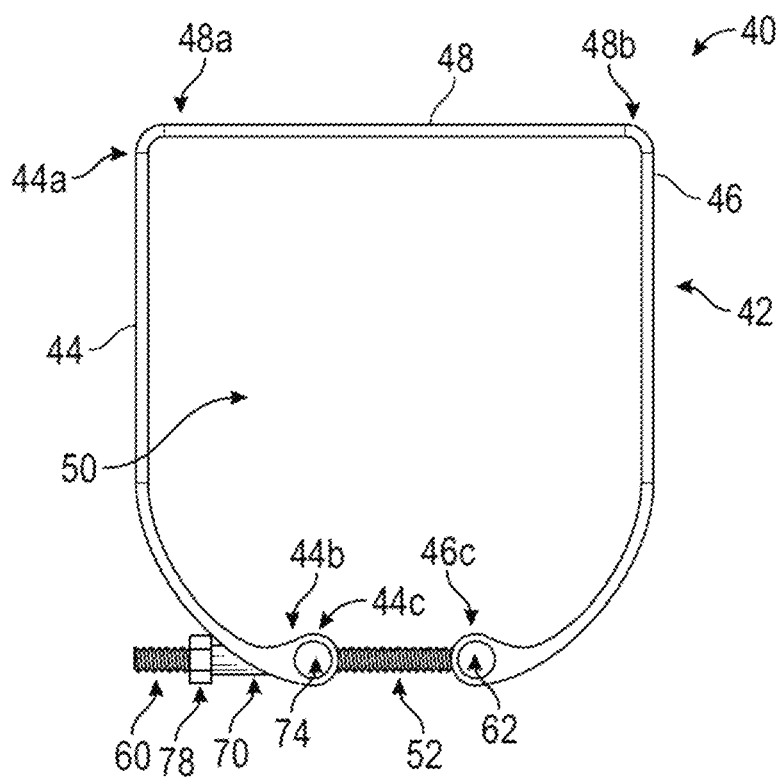
FIG. 7 is an elevation view of a strap assembly of the clamp assembly of FIG. 1.
Figures 8, 9:
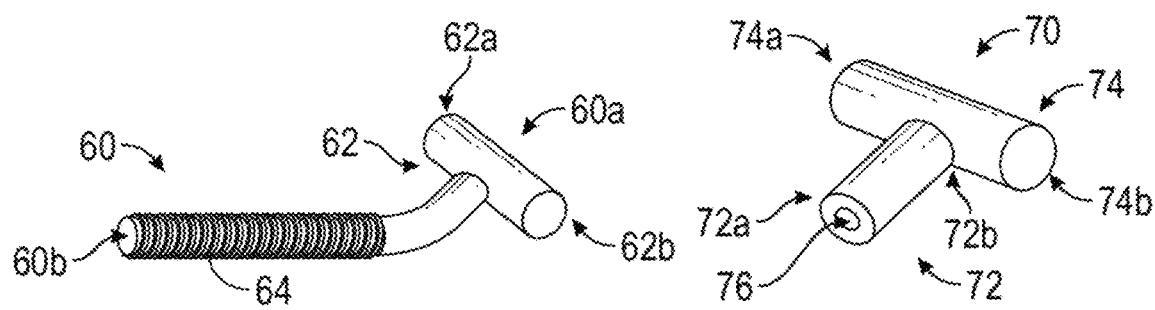
FIG. 8 is a perspective view of a strap bolt of the strap assembly of FIG. 7.
FIG. 9 is a perspective view of a trunnion of the strap assembly of FIG. 7.
Figures 10, 11:
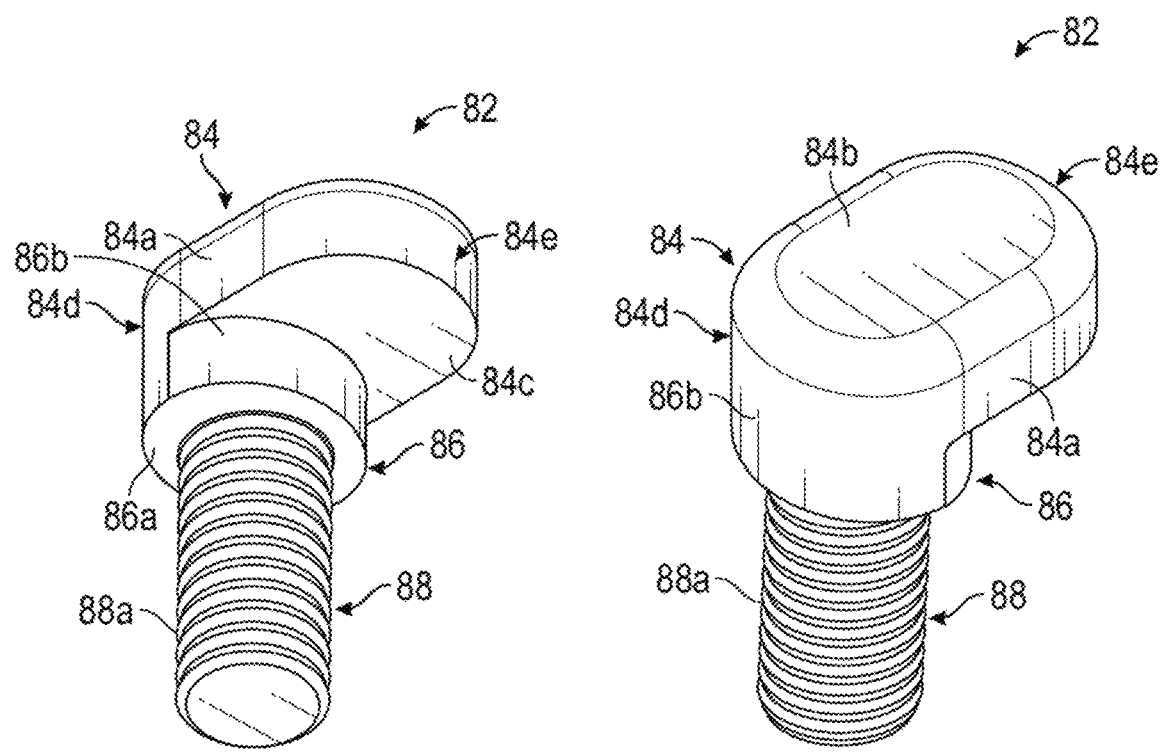
FIG. 10 is a front, perspective view, of a retaining bolt of a fastening assembly of the clamp assembly of FIG. 1.
FIG. 11 is a rear, perspective view, of the retaining bolt of FIG. 10.

With reference to FIGS. 7-9, the strap assembly 40 includes a strap 42, a strap bolt 60, and a trunnion 70. The strap 42 defines a generally D-shaped profile having first and second legs 44 and 46, respectively, joined to a backspan 48 forming a channel 50 therebetween that is configured to selectively receive a portion of a torque tube 130 (FIG. 1) therein. The backspan 48 defines a generally planar profile extending between opposed first and second end portions 48a and 48b, respectively. Although generally illustrated as having a planar profile, it is envisioned that the backspan 48 may include any suitable profile, such as arcuate, hexagonal, pentagonal, decagonal, amongst others, and may be the same or different that a profile of the torque tube 130.

The first and second legs 44, 46 are substantially similar to one another and therefore only one leg 44 of the first and second legs 44, 46 will be described in detail herein in the interest of brevity. The first leg 44 defines a generally lazy "L" shaped profile extending between opposed first and second end portions 44a and 44b, respectively. The first end portion 44a of the first leg 44 is coupled to the first end portion 48a of the backspan. The second end portion 44b of the first leg 44 includes an eye or loop 44c that is configured to rotatably receive a portion of the strap bolt 60 therein to rotatably couple the strap bolt 60 to the first leg 44. As can be appreciated, the eye 46c of the second leg 46 is configured to rotatably receive a portion of the trunnion 70 to rotatably couple the trunnion 70 to the second leg 46. The first and second legs 44, 46 are disposed in juxtaposed relation to one another, such that the eyes 44c, 46c of each of the first and second legs 44, 46 are disposed adjacent one another. The first and second legs 44, 46 cooperate to define a gap 52 therebetween that is configured to permit a portion of a torque tube 130 to pass therethrough and into the channel 50, as will be described in further detail hereinbelow.

The strap bolt 60 defines a generally "T" shaped profile having a transverse portion 62 defining a pair of legs 62a and 62b disposed at a first end portion 60a of the strap bolt 60 and having a longitudinal threaded portion 64 adjacent a second end portion 60b. The pair of legs 62a, 62b is configured to be rotatably received within the eye 44c of the first leg 44 of the strap 42 and the threaded portion 64 is configured to be slidably received within a portion of the trunnion 70 and threadably engage a nut or other suitable fastening device, as will be described in further detail hereinbelow. Although generally described as having a bend adjacent the transverse portion 62, it is envisioned that the strap bolt 60 may be straight or otherwise linear along its length, depending upon the design needs of the strap assembly 40. In one non-limiting embodiment, the strap bolt is a bent T-bolt.

With reference to FIG. 9, the trunnion 70 defines a generally "T" shaped profile having a longitudinal portion 72 extending between opposed first and second end portions 72a and 72b, respectively, and a transverse portion 74 disposed on the second end portion 72b of the longitudinal portion 72 and extending between respective first and second end portions 74a and 74b, respectively. The transverse portion 74 defines a generally circular profile having an outer dimension that is configured to be rotatably received within the eye 46c of the second leg 46. Although generally described as having a circular profile, it is contemplated that the transverse portion 74 may include any suitable profile, such as square, oval, racetrack, hexagonal, amongst others. The longitudinal portion 72 defines a generally circular profile and includes a bore 76 defined therein and extending through the first and second end portions 72a, 72b. The bore 76 is configured to slidably receive a portion of the strap bolt 60 therethrough such that a portion of the longitudinal threaded portion 64 adjacent the second end portion 60b of the strap bolt extends past the first end portion 72a of the longitudinal portion 72 of the trunnion 70. As can be appreciated, the longitudinal threaded portion 64 of the strap bolt 60 is permitted to translate within the bore 76 of the trunnion 70 to enable the strap bolt 60 to draw the eye 44c of the first leg 44 and the eye 46c of the second leg 46 towards one another to clamp or otherwise squeeze a torque tube 130 received within the channel 50 and between each of the first and second legs 44, 46. In this manner, a nut 78 or other suitable fastening device is threadably coupled to the longitudinal threaded portion 64 of the strap bolt 60 such that as the nut 78 is rotated in a first direction, the nut 78 abuts the first end portion 72a of the trunnion 70 and causes the eyes 44c, 46c of the first and second legs 44, 46 to be drawn towards one another, and when the nut 78 is rotated in a second, opposite direction, the nut 78 is caused to be drawn away from the first end portion 72a to permit the eyes 44c, 46c of the first and second legs 44, 46 to be pulled or drawn away from one another and release the torque tube 130 disposed within the channel 50.

Returning to FIGS. 1 and 2, the elongate body 14 of the support rail 12 includes one or more slots or bores (not shown) defined therein for receipt of a portion of the strap 42 of the strap assembly 40 adjacent the gap 22c and the pair of protuberances 22a, 22b. In this manner, as the torque tube 130 is received within the channel 50 of the clamp assembly the torque tube is likewise received within the gap 22c and retained between the pair of protuberances 22a, 22b by the pair of legs 44, 46 of the strap assembly 40. As can be appreciated, with the torque tube 130 received within the channel 50 of the strap assembly 40 and the gap 22c of the support rail 12, as the nut 78 of the strap assembly 40 is rotated in a first direction, the nut 78 causes the first and second legs 44, 46 to be drawn towards one another and compress or otherwise draw the torque tube 130 against the inner surface 22d of the gap 22c, and thereby the support rail 12 to secure the support rail 12 to the torque tube 130 to inhibit rotation and translation of the torque tube 130 relative to the support rail 12 and vice versa.

With reference to FIGS. 10-15, the fastening assembly 80 includes a plurality of retaining bolts 82 and a pair of spring arms 90. Each of the plurality of retaining bolts 82 is substantially similar and therefore only one retaining bolt of the plurality of retaining bolts 82 will be described in detail herein in the interest of brevity. The retaining bolt 82 defines a generally "L" shaped profile having an elongated head 84 disposed on a threaded shank 88. The elongated head 84 defines a generally racetrack profile including an outer surface 84a extending between opposed top and bottom surfaces 84b and 84c, respectively. The elongated head 84 defines a generally racetrack profile having a pair of parallel portions extending between opposed arcuate or half-circle portions disposed adjacent to opposed first and second end portions 84d and 84e, respectively. Although generally described as having a racetrack profile, it is envisioned that the elongated head may define any suitable profile, such as square, oval, hexagonal, amongst others. The bottom surface 84c includes a boss 86 disposed thereon and extending therefrom terminating at a lower surface 86a. The boss 86 defines a generally elliptical or eye shaped profile and is disposed on the bottom surface 84c of the elongated head 84 such that the boss 86 is generally concentric with the circular profile of the first end portion 84d. Although generally described as being eye shaped, it is envisioned that the boss 86 may include any suitable profile, such as circular, square, racetrack, oval, rectangular, amongst others. In this manner, the boss 86 includes an outer surface 86b extending between the bottom surface 84c of the elongated head 84 and the lower surface 86a that is generally flush with or otherwise coincident with the outer surface 84a of the elongated head 84. As can be appreciated, by being formed adjacent the first end portion 84d of the elongated head 84, the boss 86 is offset from a center portion of the elongated head 84. The outer dimension of the outer surface 86b of the boss 86 is greater than a diameter or inner dimension of the first and second pairs of bores 26, 28 formed in the support rail 12 such that the lower surface 86a of the boss 88 abuts or otherwise contacts a portion of the upper surface 16 of the support rail 12 to inhibit or otherwise prevent the boss 86 from passing through the first and second pairs of bores 26, 28. As can be appreciated, the length of the boss 86 may vary depending upon a thickness of a solar module frame to ensure proper retention of the solar module fame to the support rail 12, as will be described in further detail hereinbelow. Although generally illustrated as defining a planar surface, it is envisioned that one or both of the bottom surface 84c of the elongated head 84 and/or the lower surface 86a of the boss 86 may include a plurality of protuberances, serrations, or other suitable feature defined or disposed thereon to promote efficient grounding of a solar module when the solar module is coupled to the elongated bolt, as will be described in further detail hereinbelow.

The threaded shank 88 is disposed on the lower surface 86a of the boss 86 and extends longitudinally therefrom. The threaded shank 88 includes a generally circular profile and is generally concentric with the boss 86. The threaded shank 88 includes a threaded outer surface 88a that is configured to threadably engage a fastening device, such as a nut or the like, as will be described in further detail hereinbelow. The threaded shank 88 includes an outer dimension that is less than the inner dimension of the first and second pairs of bores 26, 28 such that the threaded shank is permitted to be received therethrough (e.g., pass into and out of the pair of bores 26, 28). It is envisioned that the retaining bolt 82 may be formed from any suitable material, such as a metallic material (e.g., steel, stainless steel, aluminum, amongst others), a polymer, a ceramic, a composite, amongst others, depending upon the design needs of the clamp assembly 10. In embodiments, the retaining bolt 82 may be formed from more than one material (e.g., the elongated head 84 may be formed from a different material than the threaded shank 88, etc.).

Figure 12:
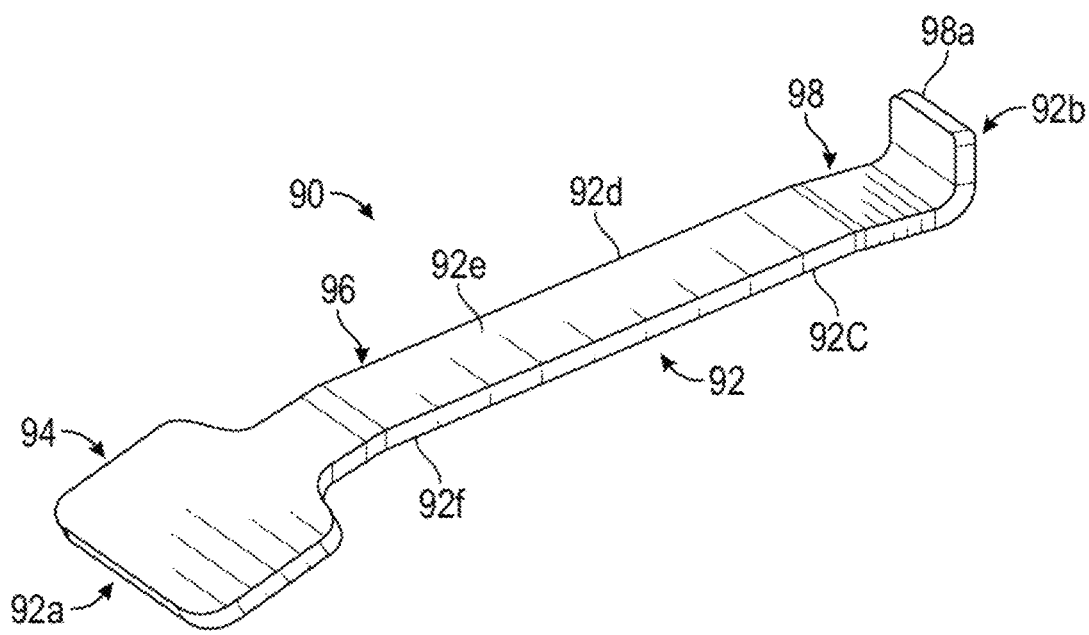
FIG. 12 is a perspective view of a spring arm of the fastening assembly of the clamp assembly of FIG. 1.
Figure 13:
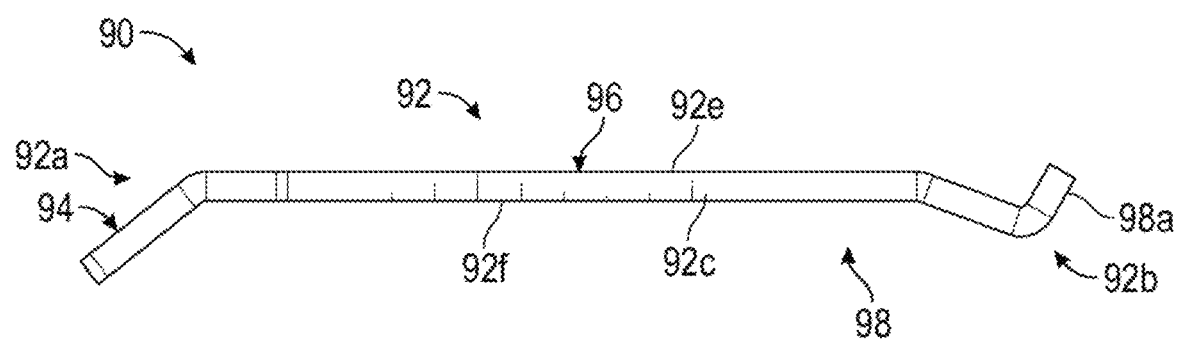
FIG. 13 is an elevation view of the spring arm of FIG. 12.

With reference to FIGS. 12 and 13, each of the pair of spring arms 90 is substantially similar to one another, and therefore, only one spring arm of the pair of spring arms 90 will be described in detail herein in the interest of brevity. The spring arm 90 includes an elongate body 92 extending between opposed first and second end portions 92a and 92b, respectively and opposed first and second side surfaces 92c and 92d, respectively. The elongate body 92 includes opposed top and bottom surfaces 92e and 94f, respectively, extending between the first and second end portions 91a, 92b and the first and second side surfaces 92c, 92d. The elongate body 92 defines a generally lazy "L" shaped profile having a rectangular or square shaped tab 94 disposed adjacent the first end portion 92a. The tab 94 transitions to a center portion 96 in a direction toward the second end portion 92b having a width that is less than that of the tab 94 (e.g., a dimension between the first and second side surfaces 92c, 92d of the tab 94 is greater than a dimension between the first and second side surfaces 92c, 92d of the rectangular portion 96). The center portion 96 defines an angle relative to the tab 94 in a direction away from the top surface 92e of the tab 94. The center portion 96 transitions to an end portion 98 that forms an angle relative to the center portion 96 in a direction away from the top surface 92e of the center portion 96. The end portion 98 includes an upturned flange 98a disposed adjacent the second end portion 92b that extends away from the top surface 92e. Although generally illustrated as forming a generally orthogonal angle with respect to the end portion 98, it is envisioned that the upturned flange 98a may form any suitable angle relative to the end portion 98. The upturned flange 98a is configured to be received within a portion of a respective slot of the pair of slots 30 and includes a length such that a portion of the upturned flange 98a extends past the upper surface 16 of the support rail to selectively engage a corresponding feature formed in the solar module 140, as will be described in further detail hereinbelow. It is envisioned that the spring arm 90 may be formed from any suitable resilient material capable of being elastically deformed and generally returning to its original shape.

Figure 14:
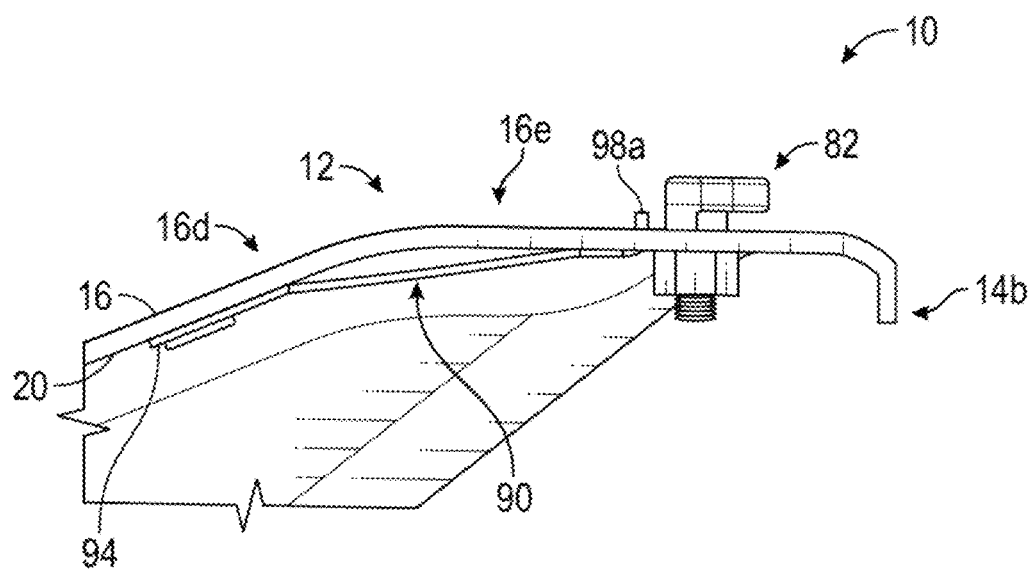
FIG. 14 is an elevation view of a portion of the clamp assembly of FIG. 1 illustrating the retaining bolt of FIG. 10 and the spring arm of FIG. 12 coupled to the support rail of FIG. 4.
Figure 15:
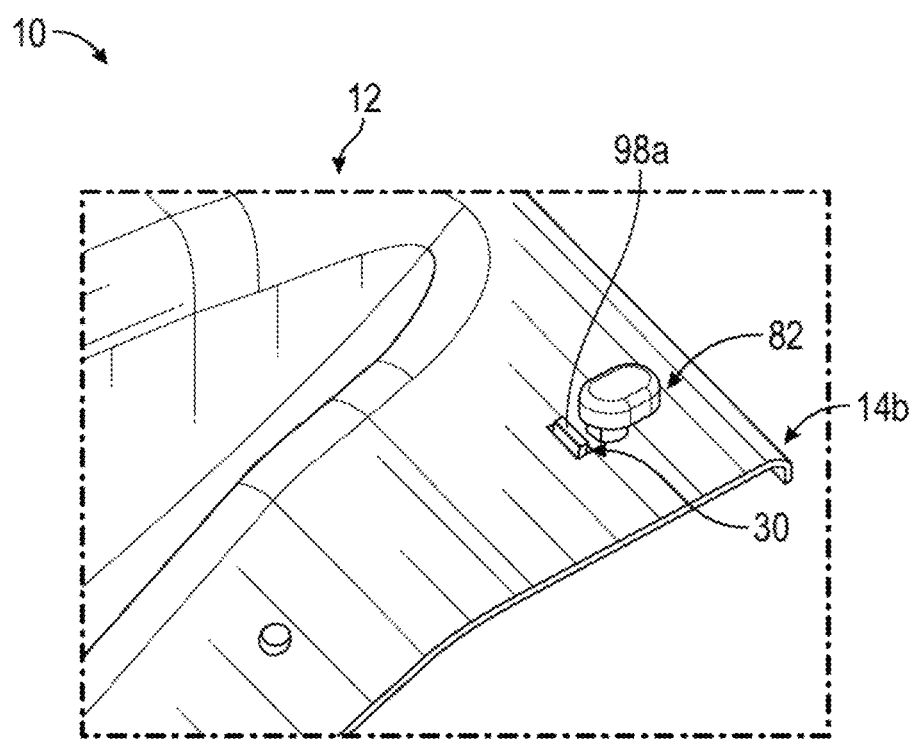
FIG. 15 is a perspective view of a portion of the clamp assembly of FIG. 1 illustrating the retaining bolt of FIG. 10 and the spring arm of FIG. 12 coupled to the support rail of FIG. 4.

With reference to FIG. 14, the top surface 92e of the tab 94 of the spring arm 90 is coupled to a portion of the lower surface 20 of the support rail 12 using any suitable means, such as fasteners, welding, adhesives, amongst others. In one non-limiting embodiment, the tab 94 is coupled to the support rail 12 by clinching, such as TOX®-Clinching. The spring arm 90 is positioned on the lower surface 20 such that the upturned flange 98a is receive through a respective slot of the pair of slots 30 and extends past the upper surface 16 of the support rail 12. In this manner, the top surface 92e of the end portion 98 abuts or otherwise contacts the lower surface 20 of the support rail 12. As can be appreciated, the biasing force of the spring arm 90 biases the top surface 92e of the end portion 98 against the lower surface 20 of the support rail 12, such that as a force is applied to the upturned flange 98a from above the upper surface 16 of the support rail 12, the upturned flange 98a is urged into the slot 30 and causes the spring arm 90 to bend or otherwise deform. When the force is no longer applied to the upturned flange 98a, the spring arm 90 is permitted to return to its original shape and bias the upturned flange 98a through the slot 30.

Figure 16:
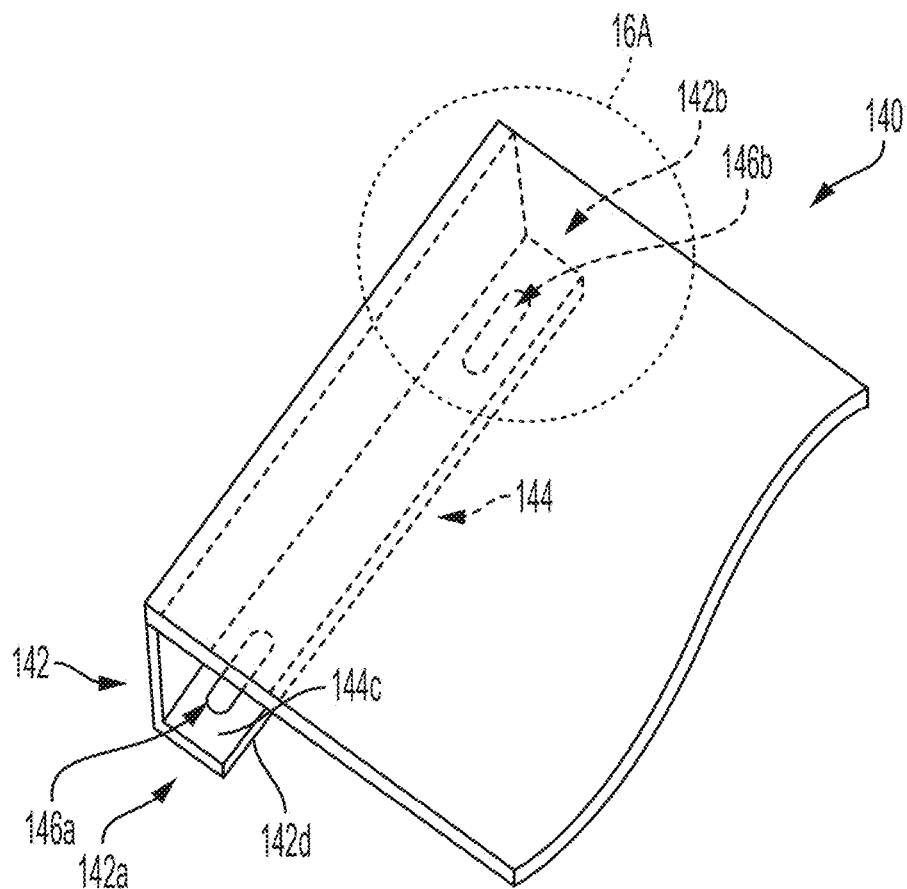
FIG. 16 is a perspective view of a solar module for use with the clamp assembly of FIG. 1.
Figure 16A:
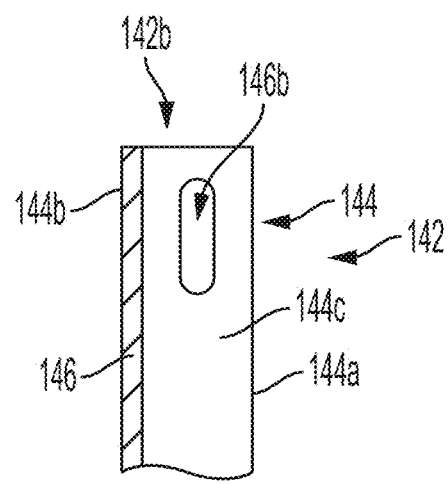
FIG. 16A is an enlarged view of the area of detail indicated in FIG. 16.

With reference to FIGS. 16 and 16A, the solar module 140 includes a frame or support flange 142. The support flange 142 defines a generally L-shaped (angle beam or angle iron) configuration extending between opposed first and second end portions 142a and 142b, respectively. The support flange 142 includes a lower flange 144 generally bisected by a vertical flange or wall 146. The lower flange 144 includes opposes first and second side surfaces 144a and 144b, respectively, and opposed top and bottom surfaces 144c and 144d, respectively, extending between each of the first and second end portions 142a, 142b and the first and second side surfaces 144a, 144b. The support flange 142 includes a vertical flange or wall 146 disposed on the top surface 144c adjacent the second side surface 144b. The lower flange 144 includes a thickness such that the lower flange 144 is permitted to be slidably received between the upper surface 16 of the support rail 12 and the bottom surface 84c of the elongated heads 84 of each of the plurality of retaining bolts 82.

The lower flange 144 includes first and second retaining grooves 146a and 146b, respectively, defined through the top and bottom surfaces 144c, 144d adjacent each respective first and second end portions 142a, 142b. As can be appreciated, each of the first and second retaining grooves 146a, 146b is generally aligned with the first and second pair of bores 26, 28 of the support rail 12 such that adjacent solar modules 140 may be selectively coupled to the support rail 12, as will be described in further detail hereinbelow. In this manner, the support rail 12 is configured to support two, adjacent solar modules 140.

With reference to FIGS. 1 and 16-19, in operation, the nut 78 of the strap assembly 40 is positioned in a loose condition such that a torque tube 130 is permitted to be received within the channel 50 formed between the first and second legs 44, 46 of the strap 42 and the gap 22c defined between the pair of protuberances 22a, 22b of the support rail 12 (FIG. 1). With the torque tube 130 received within the channel 50 and the strap 42 positioned in the desired location on the torque tube, the nut 78 is rotated in a first direction to cause the eyes 44c, 46c to be drawn towards one another and cause the torque tube 130 to be clamped or otherwise secured to the support rail 12 such that the torque tube 130 is inhibited from rotating relative to the support rail 12 (e.g., the support rail 12 and the torque tube 130 move in unison).

Figure 17:
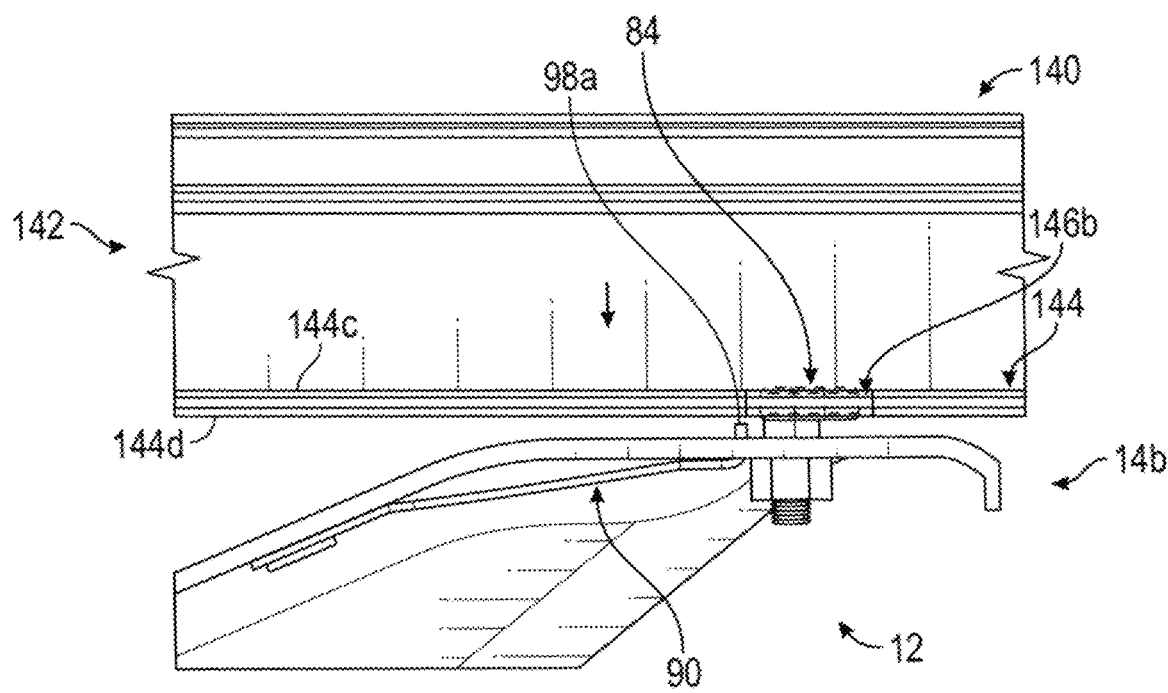
FIG. 17 is an elevation view illustrating the solar module of FIG. 16 placed over the clamp assembly of FIG. 1 and aligned with the retaining bolts of FIG. 10.
Figure 18:
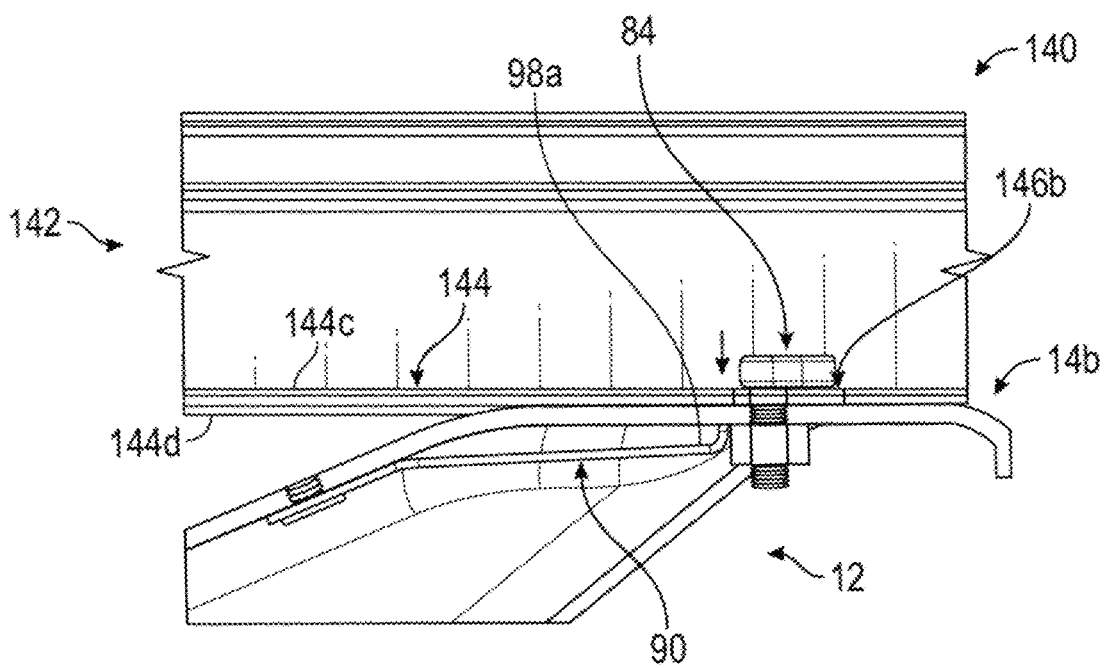
FIG. 18 is an elevation view illustrating the retaining bolts of FIG. 10 received within a retaining groove formed in the solar module of FIG. 16.

With the torque tube 130 secured to the support rail 12 via the strap assembly 40, the solar module 140 is positioned above the support rail 12 in a first position where the elongated heads 84 of each of the plurality of retaining bolts 82 is aligned with a respective retaining groove of the first and second retaining grooves 146a, 146b of the solar module 140 (FIG. 17). With the elongated heads 84 of the plurality of retaining bolts 82 aligned with the first and second retaining groves 146a, 146b of the solar module 140, the solar module 140 is pushed or otherwise moved towards the upper surface 16 of the support rail 12 such that each of the elongated heads 84 of the plurality of retaining bolts 82 is received within a respective retaining groove of the first and second retaining grooves 146a, 146b (FIG. 18). In this position, the upturned flanges 98a of the pair of spring arms 90 are offset from the second retaining groove 146b such that continued movement of the solar module 140 towards the upper surface 16 of the support rail 12 causes the bottom surface 144d of the lower flange 144 to abut a portion of each of the upturned flanges 98a. Further movement of the solar module 140 towards the upper surface 16 causes the upturned flanges 98a to be pushed or otherwise urged into the pair of slots 30 of the support rail 12 such that an upper portion of the upturned flanges 98a is substantially coplanar with the upper surface 16 and the bottom surface 144d of the lower flange 144 is permitted to abut or otherwise contact the upper surface 16 of the support rail 12.

Figure 19:
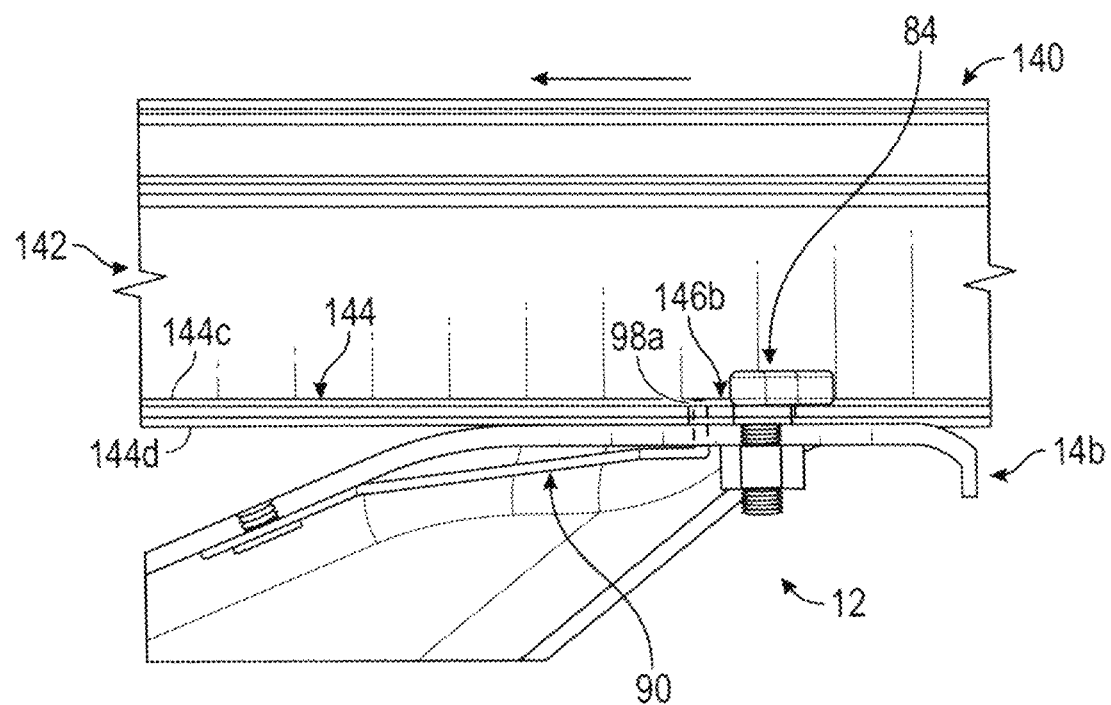
FIG. 19 is an elevation view illustrating a portion of the spring arm of FIG. 12 received within the retaining groove of the solar module of FIG. 16 and the retaining bolts of FIG. 10 engaged with a portion of the solar module of FIG. 16 to retain the solar module of FIG. 16 to the support rail of FIG. 4.
Figure 20:
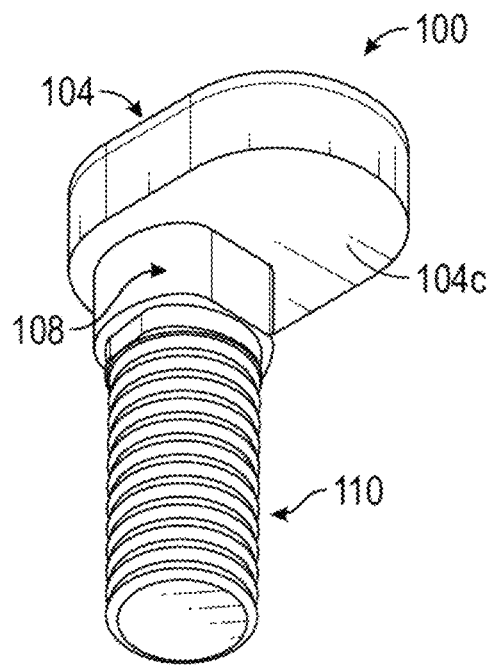
FIG. 20 is a front, perspective view, of another embodiment of a retaining bolt provided in accordance with the present disclosure.
Figure 21:
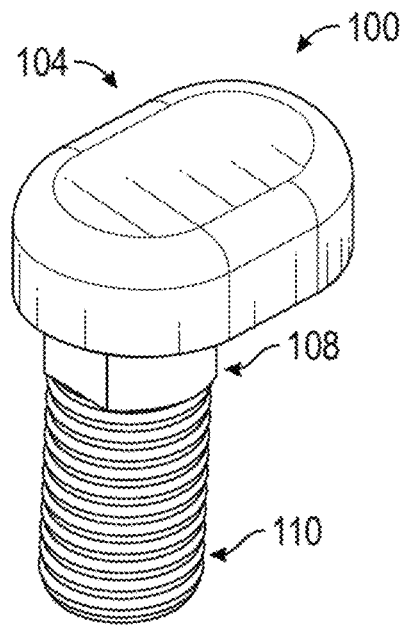
FIG. 21 is a rear, perspective view of the retaining bolt of FIG. 20.
Figure 22:
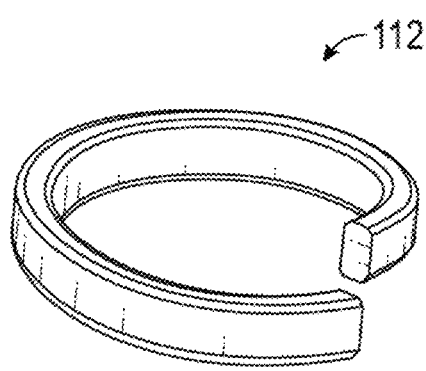
FIG. 22 is a perspective view of a biasing element for use with the retaining bolt of FIG. 20.
Figure 23:
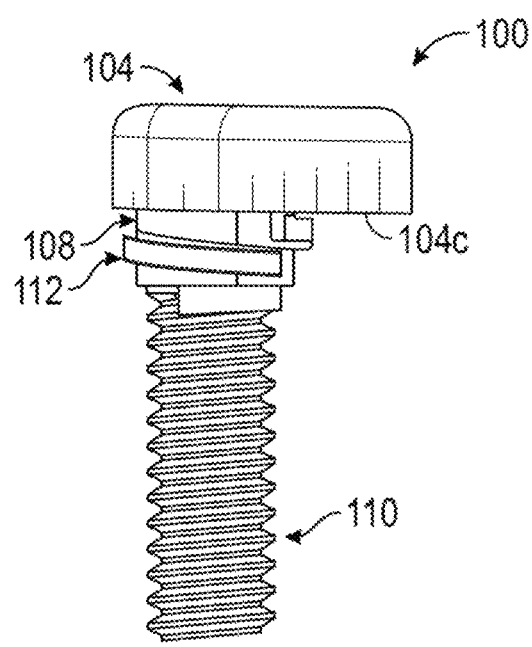
FIG. 23 is a side, elevation view, of the biasing element of FIG. 22 disposed over a threaded shank and boss of the retaining bolt of FIG. 20.
Figure 24:
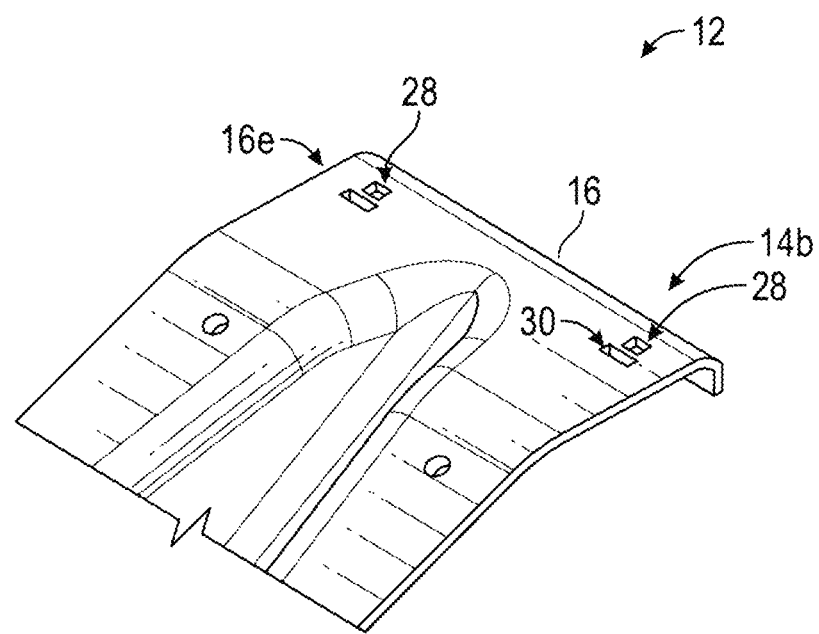
FIG. 24 is a perspective view of the support rail of FIG. 4 illustrating square bores for receipt of the retaining bolt of FIG. 20.
Figure 25:
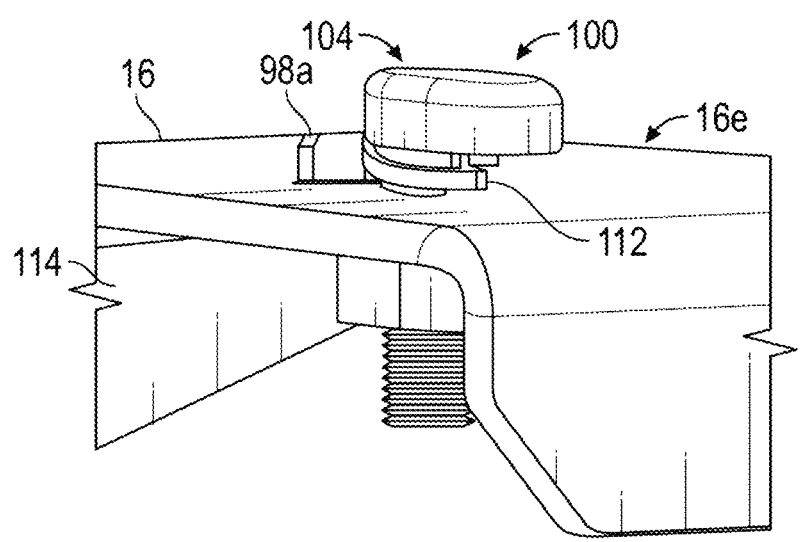
FIG. 25 is a perspective view of the retaining bolt and biasing element assembly of FIG. 23 coupled to the support rail of FIG. 4.

With the bottom surface 144d of the lower flange 144 of the solar module 140 abutting the upper surface 16 of the support rail 12, the elongated heads 84 of the plurality of retaining bolts 82 protrude through the first and second retaining grooves 146a, 146b an amount that permits the lower flange 144 to be received within the gap formed between the bottom surface 84c of the elongated heads 84 of each of the plurality of retaining bolts 82 and the upper surface 16 of the support rail 12. At this point, the solar module 140 is drawn or otherwise slid across the upper surface 16 of the support rail 12 towards the first end portion 14a of the support rail 12 to cause respective portions of the lower flange 144 to be received within the gap formed between the bottom surface 84c of the elongated heads 84 of each of the plurality of retaining bolts 82 and the upper surface 16 of the support rail 12 (FIG. 19). Continued movement of the solar module 140 towards the first end portion 14a of the support rail 12 causes the upturned flanges 98a of the pair of spring arms 90 to align with a respective portion of the second retaining groove 146b adjacent the first end portion 84d of the elongated heads 84 of the retaining bolts 82 received within the second retaining groove 146b. Alignment of the upturned flanges 98a of the pair of spring arms 90 with the second retaining groove 146b permits the upturned flanges 98a to be biased into the second retaining groove 146b to retain or otherwise inhibit movement of the solar module 140 along the longitudinal axis A-A in a direction towards the second end portion 14b of the support rail 12. As can be appreciated, capturing the lower flange 144 of the solar module 140 between the bottom surface 84c of the elongated heads 84 of each of the plurality of retaining bolts 82 and the upper surface 16 of the support rail 12 inhibits movement of the solar module 140 in a direction towards the first end portion 14a of the support rail and lateral and vertical movement of the solar module 140 relative to the support rail 12.

As can be appreciated, removal of the solar module 140 from the support rail 12 follows the above-described process in substantially reverse order, except that initially, the upturned flanges 98a of the pair of spring arms 90 is depressed below the bottom surface 144d of the lower flange 144 to disengage the upturned flanges 98a from the second retaining groove 146b of the lower flange 144. With the upturned flanges 98a of the pair of spring arms 98a disengaged from the second retaining groove 146b, the solar module 140 is permitted to be moved or otherwise urged towards the second end portion 14b of the support rail 12 to remove the lower flange 144 from between the bottom surface 84c of the elongated heads 84 of each of the plurality of retaining bolts 82 and the upper surface 16 of the support rail 12 and allow the elongated heads 84 of each of the plurality of retaining bolts 82 to be removed from the first and second retaining grooves 146a, 146b of the solar module 140, and therefore, permit removal of the solar module 140 from the support rail 12.

Turning to FIGS. 20-25, another embodiment of a retaining bolt is illustrated and generally identified by reference numeral 100. The retaining bolt 100 is substantially similar to the retaining bolt 88, and therefore, only the differences therebetween will be described in detail herein in the interest of brevity.

The boss 108 of the retaining bolt 100 includes an outer dimension that is generally the same as the outer dimension of the threaded shank 110 such that the boss 108 may be received within a bore of the first and second pairs of bores 26, 28 of the support rail 12. In this manner, a portion of the bottom surface 104c of the elongated head 104 is revealed about a circumference of the boss 108. A biasing element 112 is configured to be disposed over the boss 108 and abut a portion of the bottom surface 104c of the elongated head 104 and a portion of the upper surface 16 of the support rail 12 (e.g., the threaded shank 110 and the boss 108 are configured to be received within an interior portion of the biasing element 112). In this manner, the biasing element 112 is interposed between the bottom surface 104c of the elongated head 104 and the upper surface 16 of the support rail 12. In embodiments, the first and second pair of bores 26, 28 of the support rail 12 may include a square configuration (FIG. 24) rather than a circular configuration to aid in inhibiting the biasing element from being received through the first and second pair of bores 26, 28. Although generally described as both the first and second pair of bores 26, 28 having a square configuration, it is envisioned that only one of the first and second pair of bores 26, 28 may include a square configuration, or any and all of the first and second pair of bores 26, 28 may include any suitable configuration, such as oval, rectangular, racetrack, hexagonal, amongst others.

The biasing element 112 biases the elongated head 104 away from the upper surface 16 to form a gap between the bottom surface 104c and the upper surface 16. The size of this gap between the bottom surface 104c and the upper surface 16 can be adjusted to accommodate different wall thicknesses of the support rail 12 by rotating a nut 114 that is threadably engaged with the threaded shank 110 of the retaining bolt 100 in a first direction to reduce the gap (e.g., cause the biasing element 112 to be compressed) or by rotating the nut 114 in a second, opposite direction to increase the gap (e.g., cause the biasing element 112 to urge the elongated head 104 away from the upper surface 16).

It is envisioned that the biasing element 112 may be any suitable biasing element, such as a coil spring, a belleville washer, a wave spring, a finger spring, a polymeric spring, rubber o-rings, flower washers, amongst others. In one non-limiting embodiment, the biasing element 112 is a spring washer or a split washer. As can be appreciated, by permitting the gap formed between the bottom surface 104c of the elongated head 104 and the upper surface 16 of the support rail 12 to be adjusted, the gap can be preadjusted during manufacturing of the clamp assembly 10. During assembly in the field, only one half turn or one turn of the nut 114 is needed to secure the retaining bolt 100 to the support rail 12, and therefore, the solar module 140, to the support rail 12, further decreasing the amount of time required to secure a solar module 140 to the support rail and decreasing the amount of different retaining bolts 100 to be manufactured for support rails 12 having differing thicknesses. As can be appreciated, the assembly process of the clamping assembly 10 utilizing the retaining bolt 100 is substantially similar to the assembly process of the clamping assembly 10 utilizing the retaining bolt 82, except that once the lower flange 144 of the solar module 140 is received within the gap formed between the lower surface 104c of the retaining bolt 100 and the upper surface 16 of the support rail 12, the nut 114 is tightened to secure the lower flange 144 between the lower surface 104c of the retaining bolt 100 and the upper surface 16 of the support rail 12. It is envisioned that the spring arm 90 may be omitted when the retaining bolt 100 and biasing element 112 are utilized as clamping the retaining bolt 100 to the flange 144 of the solar module 140 effectively couples the clamp assembly 10 to the solar module 140 and inhibits relative movement therebetween.

Figure 26:
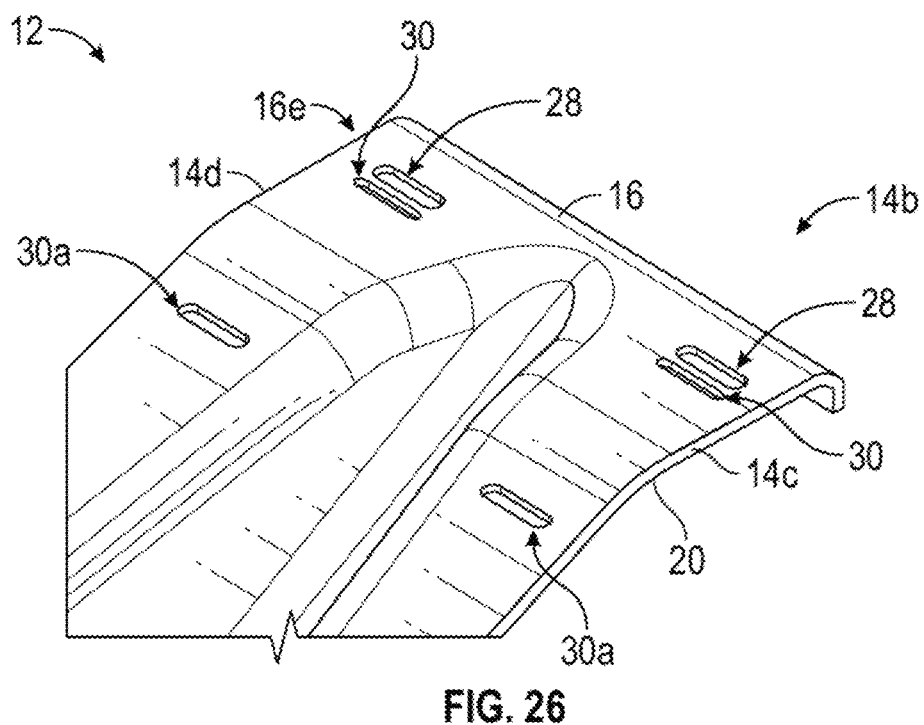
FIG. 26 is a perspective view of an alternative embodiment of the support rail of FIG. 4.

Turning to FIG. 26, in embodiments, it is envisioned that the first and second pairs of bores 26, 28 may be elongated in a direction extending between each of the opposed side surfaces 14c, 14d. In this manner, the first and second pairs of bores 26, 28 may include an oval or racetrack profile, although it is envisioned that the first and second pairs of bores 26, 28 may include any suitable profile, such as rectangular or the like. Although generally described as both the first and second pair of bores 26, 28 being elongated, it is envisioned that only one of the first and second pairs of bores 26, 28 or individual bores of the first and second pairs of bores 26, 28 may be elongated with the remaining bores having a different profile (e.g., circular, square, hexagonal, etc.).

It is envisioned that the pair of slots 30 may also be elongated in a direction extending between each of the opposed side surfaces 14c, 14d of the support rail 12 in a similar manner to the elongated first and second pairs of bores 26, 28. As can be appreciated, the support rail 12 may include a corresponding pair of spring arm slots 30a defined through the upper and lower surfaces 16 and 20 on a portion of the second sloped portion 16d of the support rail to receive a portion of a rivet or other suitable fastener to couple the spring arm 90 to the support rail 12. In this manner, the elongated pair of slots 30 and the pair of spring arm slots 30a enable the transverse location of the spring arm 90 to be adjusted. As can be appreciated, the elongated first and second pairs of bores 26, 28 cooperate with the elongated pair of slots 30 and the pair of spring arm slots to accommodate solar modules 140 having the first and second retaining grooves 146a, 146b arranged in different spacings. In this manner, the assembly of the clamp assembly 10 to the solar module 140 is substantially similar to that described above utilizing the retaining bolt 100 and biasing element 112 except that the retaining bolts 100 and the pair of spring arms 90, if utilized), are initially horizontally aligned with the first and second retaining grooves 146a, 146b before being proceeding with the assembly procedure described in detail hereinabove.

Turning to FIGS. 27-38, another embodiment of a clamp assembly provided in accordance with the present disclosure is illustrated and generally identified by reference numeral 200. The clamp assembly 200 includes a support rail 212, the clamp assembly 40, and a fastening assembly 280.

Figure 27:
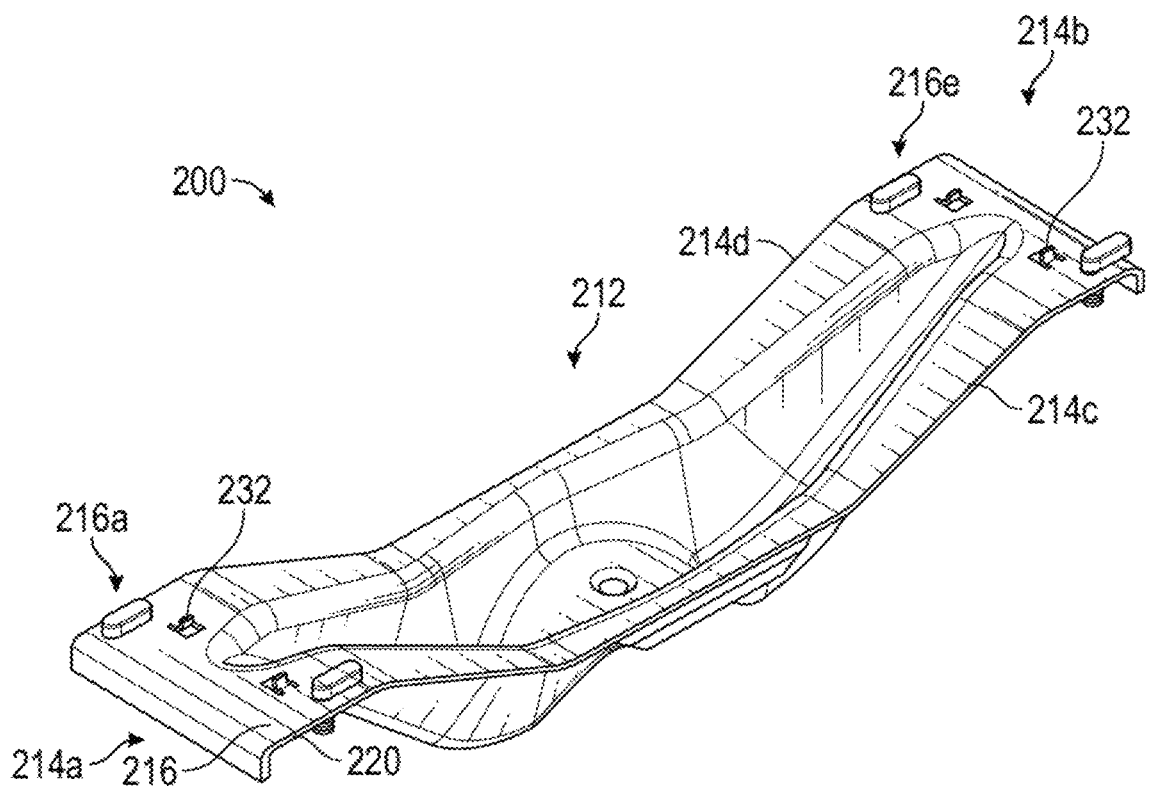
FIG. 27 is a perspective view of an alternative embodiment of a clamp assembly provided in accordance with the present disclosure.
Figure 28:
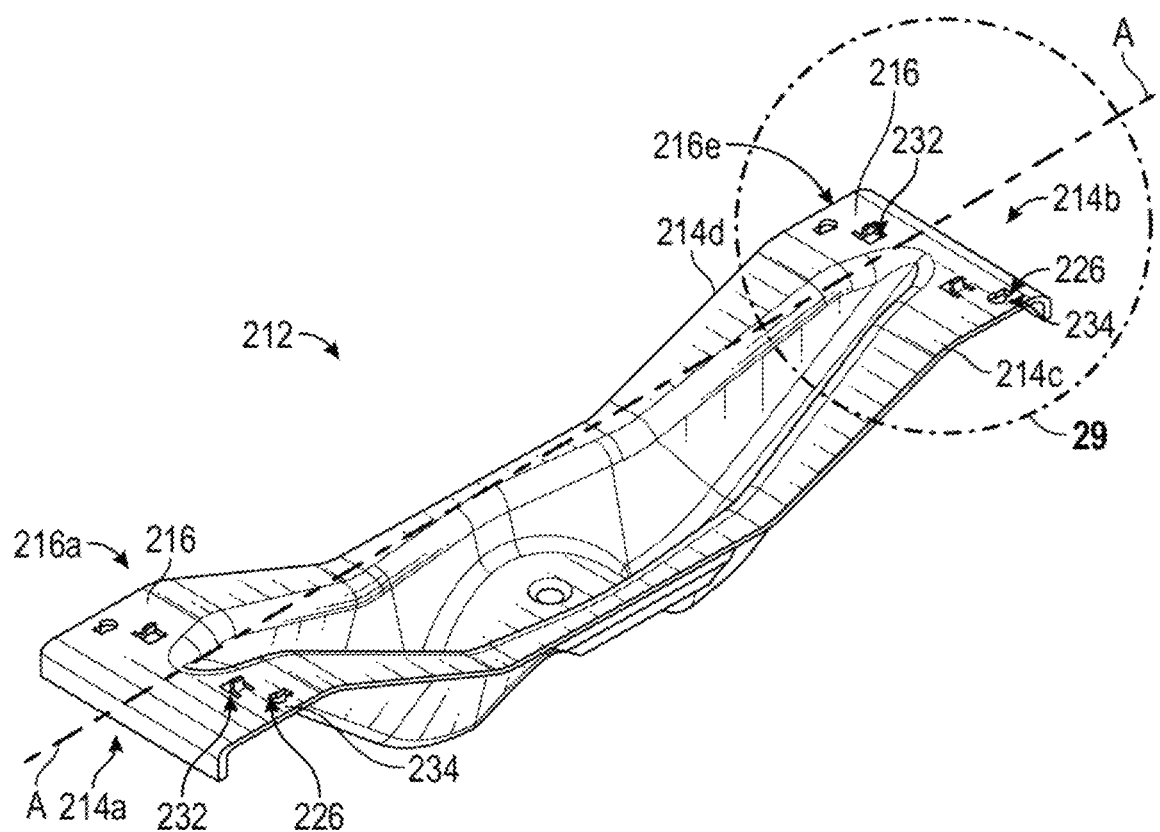
FIG. 28 is a perspective view of a support rail of the clamp assembly of FIG. 27.
Figure 29:
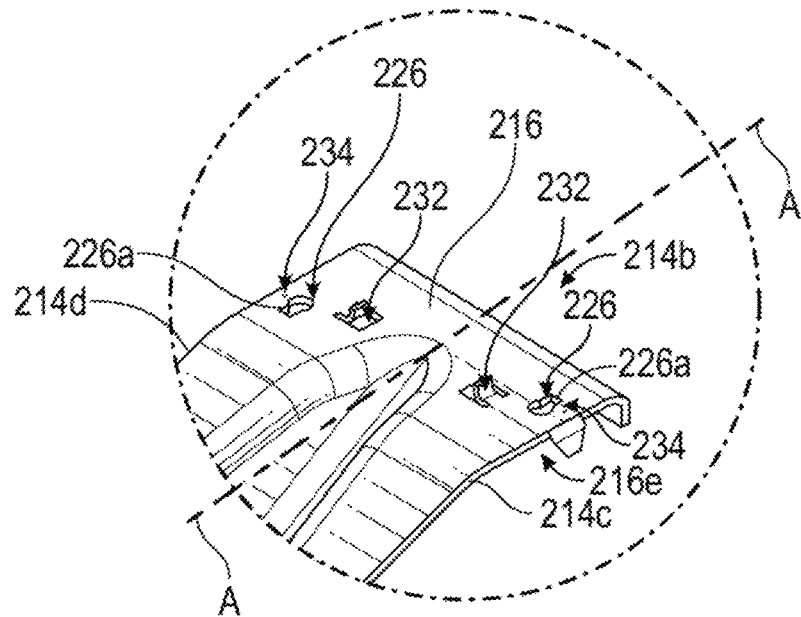
FIG. 29 is an enlarged view of the area of detail indicated in FIG. 28.
Figure 30:
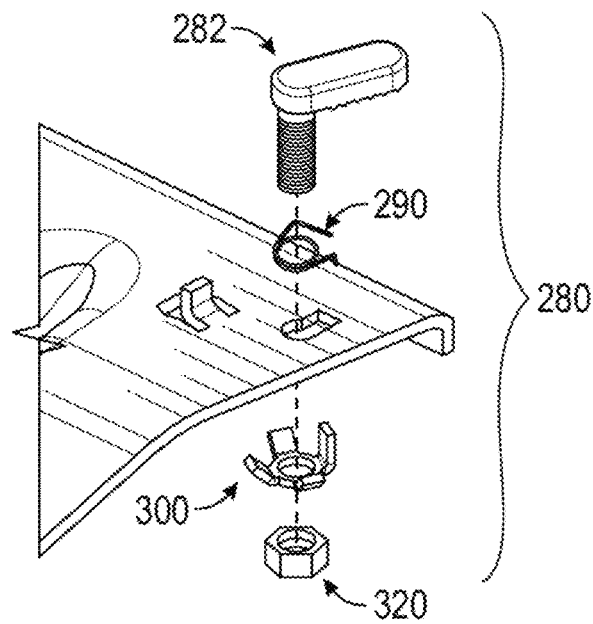
FIG. 30 is an exploded view of a fastening assembly of the clamp assembly of FIG. 27.
Figure 31:
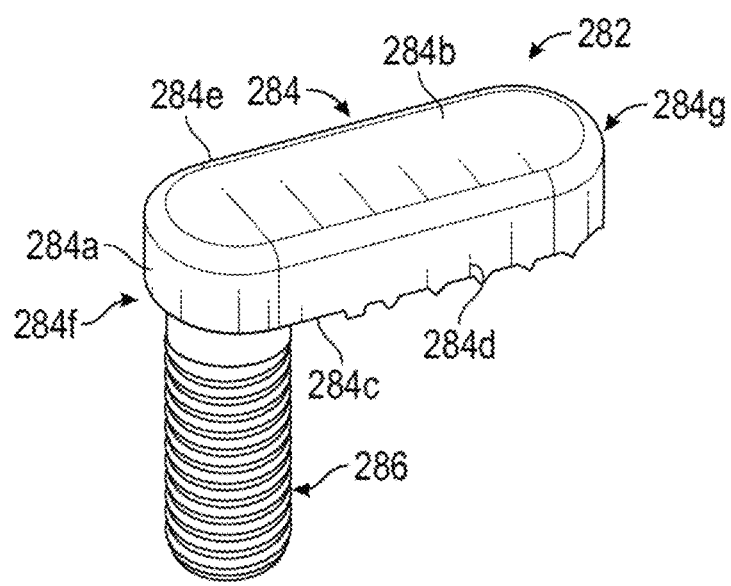
FIG. 31 is a top, perspective view, of a retaining bolt of the fastening assembly of FIG.
Figure 32:
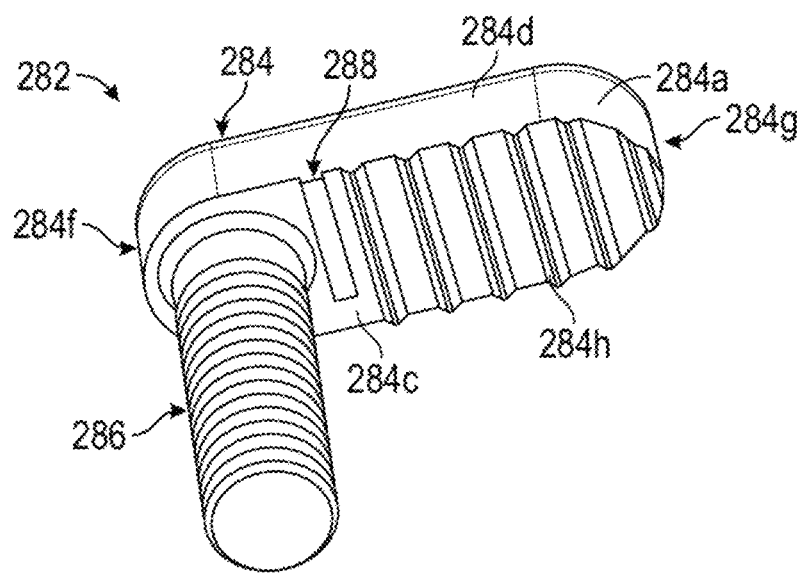
FIG. 32 is a bottom, perspective view, of the retaining bolt of FIG. 31.

With reference to FIGS. 27-29, the support rail 212 is substantially similar to the support rail 12 described herein above and therefore, only the differences therebetween will be described in detail herein in the interest of brevity. The second planar portion 216e includes a pair of upturned flanges 232 disposed on the upper surface 216 and extending vertically therefrom (e.g., in the same direction in which the upper surface 216 is facing). The each of pair of upturned flanges 232 is disposed in a mirrored or juxtaposed relation to one another about the longitudinal axis A-A defined through the first and second opposed end portions 214a, 214b of the support rail 212. Each of the pair of upturned flanges 232 is generally extend along the longitudinal axis A-A such that the pair of upturned flanges 232 define a generally square configuration, although it is contemplated that the pair of upturned flanges 232 may include any suitable configuration, such as rectangular, oval, circular, amongst others. Although generally illustrated as being formed by punching, it is contemplated that the pair of upturned flanges 232 may be formed using any suitable method, such as welding, fasteners, adhesives, hydroforming, additive manufacturing, stamping, machining, amongst others. Each of the pair of upturned flanges 232 is configured to be received within a corresponding bore defined within a portion of a solar module 140, as will be described in further detail hereinbelow.

Continuing with FIGS. 27-29, the second planar portion 216e of the support rail 212 includes a pair of keyholes 226 defined through the upper and lower surfaces 216, 220. The pair of keyholes 226 define a generally circular profile with a notch 226a cut through an outer circumference thereof (e.g., a keyhole shape) that is configured to receive a portion of a retaining washer therethrough, as will be described in further detail hereinbelow. The pair of keyholes 226 is disposed on either side of the longitudinal axis A-A (e.g., a first closest to the first side surface 214c and a second closest to the second side surface 214d) and in a flipped configuration. In this manner, the notch 226a of the keyhole 226 disposed closest to the first side surface 214c is facing the second end portion 214b and the notch 226a of the keyhole 226 disposed closest to the second side surface 214d is facing the first end portion 214a. The keyhole 226 disposed closest to the first side surface 214c is offset relative to the pair of upturned flanges 232 towards the second end portion 214b and the keyhole disposed closest to the second side surface 214d is offset relative to the pair of upturned flanges 232 towards the first end portion 214a and each of the pair of keyholes 226 is disposed further towards each of the first and second opposed side surfaces 214c, 214d than the pair of upturned flanges 232. Although generally described as being disposed in the positions described hereinabove, it is envisioned that each of the pair of keyholes 226 and the pair of upturned flanges 232 may be disposed at position relative to each other depending upon the design needs of the clamp assembly 200.

The second planar portion 216e of the support plate includes a pair of apertures 234 defined through the upper and lower surfaces 216, 220 for receipt of a portion of a biasing element of the fastening assembly 280. Each of the pair of apertures 234 is disposed adjacent a respective keyhole of the pair of keyholes 226 on a side adjacent to each of the first and second opposed side surfaces 214c, 214d, respectively. Although generally illustrated as including a circular profile, it is envisioned that the pair of apertures 234 may include any suitable profile, such as square, hexagonal, oval, rectangular, amongst others, and may include the same or different profile as compared to one another. The first planar portion 216a of the support rail 212 is similar to the second planar portion 216e and includes the pair of upturned flanges 232, the pair of keyholes 230, and the pair of apertures 234 disposed adjacent the first end portion 214a.

With reference to FIGS. 30-35, the fastening assembly 280 includes a retaining bolt 282, a biasing element 290, a retaining washer 300, and a nut 320. The clamp assembly 200 includes a plurality of fastening assemblies 280 which are each substantially similar to one another, and therefore, only one fastening assembly 280 will be described in detail herein in the interest of brevity.

The retaining bolt 282 defines a generally "L" shaped profile having an elongated head 284 disposed on a threaded shank 286. The elongated head 284 defines a generally racetrack profile including an outer surface 284a extending between opposed top and bottom surfaces 284b and 284c, respectively. The elongated head 284 defines a generally racetrack profile having a pair of parallel portions 284d and 284e, respectively, extending between opposed arcuate or half-circle portions disposed adjacent to opposed first and second end portions 284f and 284g, respectively. The threaded shank 286 is disposed on the bottom surface 284c substantially concentrically with the arcuate profile of the elongated head 284 adjacent the first end portion 284f and includes an outer dimension that is less than an outer dimension of the outer surface 284a such that a portion of the bottom surface 284c of the elongated head 284 is revealed about a circumference of the threaded shank 286.

The bottom surface 284c of the elongated head 284 includes an elongated boss 288 disposed thereon that is configured to engage a corresponding portion of the biasing element 290, as will be described in further detail hereinbelow. The bottom surface 284c of the elongated head 284 includes a plurality of crenellations or protuberances 284h defined therein or disposed thereon that are configured to grip or otherwise enhance the ability of the bottom surface 284c to grasp a portion of the solar module 140, although it is contemplated that the bottom surface 284c of the elongated head 284 may include any suitable profile, such as planar, convex, concave, amongst others.

Figure 33:
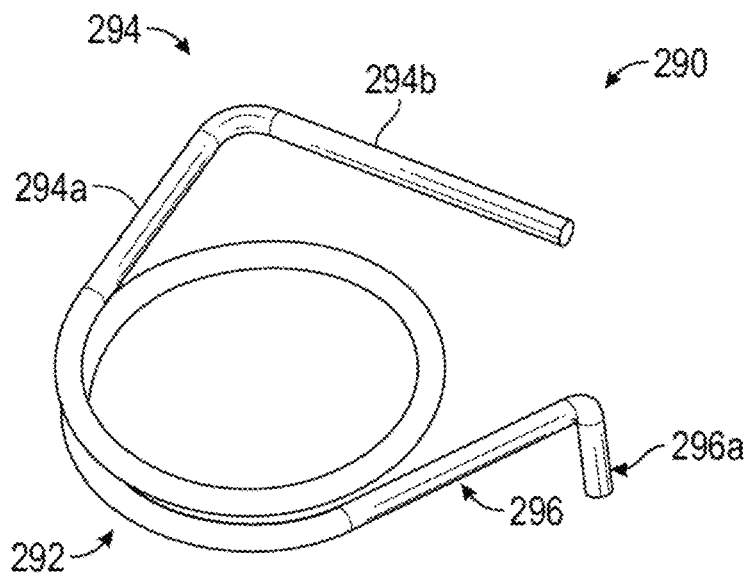
FIG. 33 is a perspective view of a biasing element of the fastening assembly of FIG. 30.

With reference to FIG. 33, the biasing element 290 defines a generally modified coil spring configuration having a circular center portion 292 and a pair of upper and lower legs 294 and 296 extending therefrom. The upper leg 294 includes a first linear portion 294a extending generally tangentially from the center portion 292. The first linear portion 294a transitions to a second linear portion 294b disposed at a generally orthogonal angle relative to the first linear portion 294a, although it is contemplated that the first and second linear portions 294a, 294b may form any suitable angle relative to one another and the center portion 292. The second linear portion 294b extends in a direction generally across the center portion, but offset relative thereto, and is configured to engage the elongated boss 288 of the retaining bolt 282, as will be described in further detail hereinbelow.

The lower leg 296 extends generally tangentially from the center portion 292 defining an interior angle relative to the upper leg 294 that is generally less than 90 degrees, although it is contemplated that the lower leg 296 may define any suitable angle relative to the upper leg 294 depending upon the design needs of the clamp assembly 200. The lower leg 296 transitions to a downturned tab 296a extending in a direction away from the upper leg 294. The downturned tab 296a defines a generally orthogonal angle relative to the lower leg 296 and is configured to be received within an aperture of the pair of apertures 234 of the support rail 212 to rotatably retain the biasing element 290 to the support rail 212. The biasing element 290 is formed from any suitable resilient material such that the biasing element may be elastically deformed and substantially return to its original shape.

Figure 34:
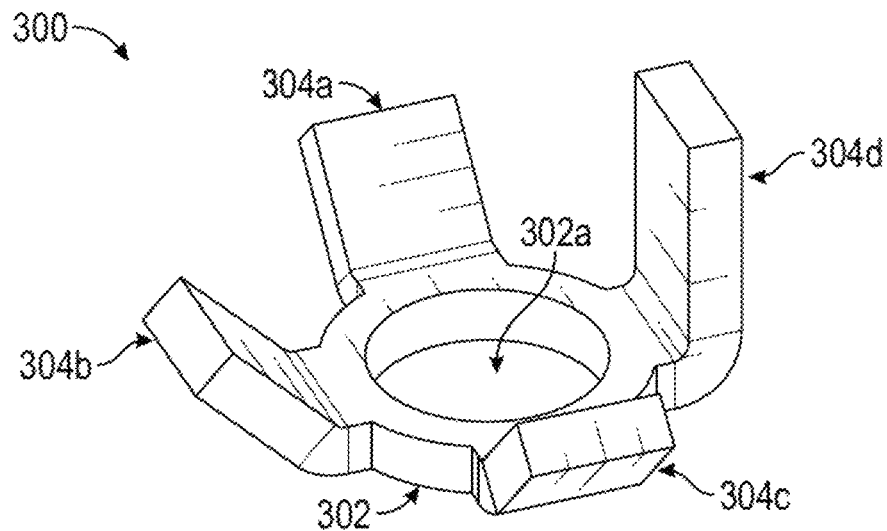
FIG. 34 is a perspective view of a retaining washer of the fastening assembly of FIG. 30.

With reference to FIG. 34, the retaining washer 300 defines a generally circular center portion 302 including four upturned flanges 304a, 304b, 304c, and 304d extending therefrom and disposed generally 90 degrees apart from one another about a circumference of the center portion 302. The upturned flanges 304a, 304b, and 304c are disposed at a diagonal angle relative to the center portion (e.g., between parallel to and orthogonal to the center portion 302) such that as a force is applied to each of the upturned flanges 304a, 304b, and 304c, each of the upturned flanges 304a, 304b, and 304c is caused to deform or otherwise be flattened and provide a biasing force in reaction thereto. The upturned flange 304d is disposed at a generally orthogonal angle relative to the center portion 302 and includes a length that is generally greater than a length of each of the upturned flanges 304a, 304b, and 304c. The upturned flange 304d is configured to be received within a portion of the notch 226a of the support rail 212 to retain an orientation of the retaining washer 300 relative to the support rail 212 and therefore, the retaining bolt 282, as will be described in further detail hereinbelow. The center portion 302 includes a bore 302a defined therethrough that is configured to receive a portion of the threaded shank 286 of the retaining bolt 282 therethrough.

Figure 35:
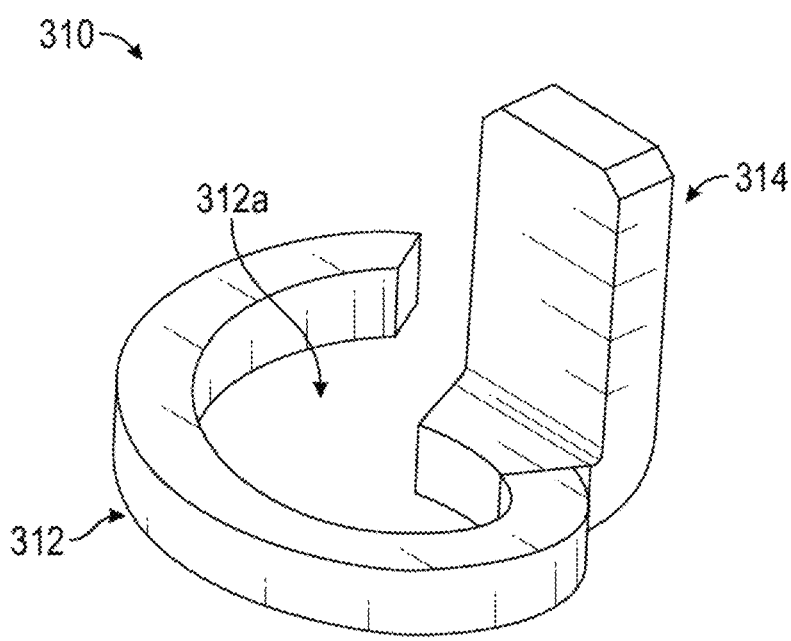
FIG. 35 is a perspective view of another embodiment of a retaining washer of the fastening assembly of FIG. 30.

With reference to FIG. 35, another embodiment of the retaining washer is illustrated and generally identified by reference numeral 310. The retaining washer 310 includes a biasing element 312 that is substantially similar to the biasing element 112 described hereinabove and therefore will not be described in further detail hereinbelow. The biasing element 312 includes an upturned flange 314 disposed on a portion thereof that is disposed at a generally orthogonal angle relative to the biasing element 312 (e.g., generally parallel with a longitudinal axis defined through a center portion of the biasing element 312). The upturned flange 314 is configured to be received within a portion of the notch 226a of the support rail 212 to retain an orientation of the retaining washer 310 relative to the support rail 212 and therefore, the retaining bolt 282, as will be described in further detail hereinbelow. The biasing element 312 includes a bore 312a defined therethough that is configured to receive a portion of the threaded shank threaded shank 286 of the retaining bolt 282 therethrough.

As can be appreciated, the biasing element 312 provides a biasing force against compression thereof. It is envisioned that the biasing element 312 may be any suitable biasing element, such as a coil spring, a belleville washer, a wave spring, a finger spring, a polymeric spring, rubber o-rings, amongst others. In one non-limiting embodiment, the biasing element 312 is a spring washer or a split washer and may be formed from any suitable resilient material that permits elastic deformation of the biasing element and permitting the biasing element 312 to substantially return to its original shape.

Returning to FIG. 30, as assembled, the downturned tab 296a of the lower leg 296 of the biasing element 290 is advanced within an aperture 234 of the support rail 212 such that the biasing element 290 is rotatably supported by the support rail 212. The threaded shank 286 of the retaining bolt 282 is advanced within the keyhole 226 that is adjacent the aperture 234 in which the downturned tap 296a of the biasing element 290 is received. The retaining bolt 282 is further advanced within the keyhole 226 and oriented such that the elongated head 284 extends in a direction that is the same direction in which the notch 226a is extending. Further advancement of the retaining bolt 282 within the keyhole 226 causes the second linear portion 294b of the upper leg 294 of the biasing element to engage the elongated boss 288 of the retaining bolt 282 such that rotation of the retaining bolt 282 within the keyhole causes a corresponding deformation of the biasing element 290, as will be described in further detail hereinbelow.

Figure 36:
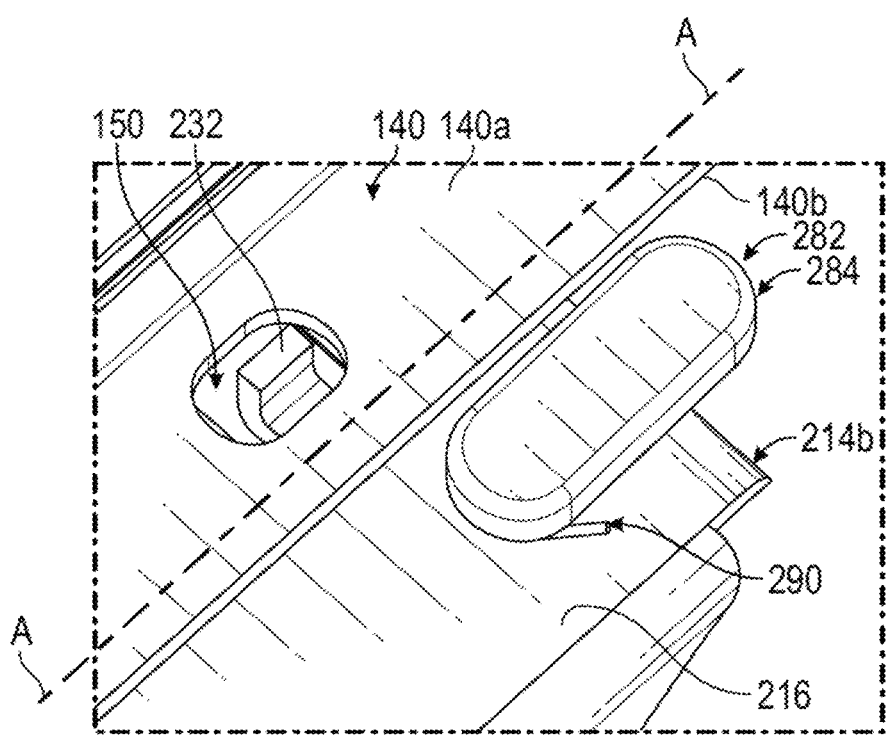
FIG. 36 is a perspective view of the clamp assembly of FIG. 27 illustrating the clamp assembly placed in an initial, open position.

With the retaining bolt 282 received within the keyhole 226, the retaining washer 300 is advanced over the threaded shank 286 of the retaining bolt 282 such that the threaded shank 286 is received within the bore 302a of the retaining washer 300. The retaining washer 300 is further advanced over the threaded shank 282 towards the lower surface 220 of the support rail 212 such that the upturned flange 304d is received within the notch 226a of the keyhole 226 and a portion of each of the upturned flanges 304a, 304b, and 304c abuts or otherwise contacts a portion of the lower surface 220 of the support rail 212. At this point, the nut 320 is threadably engaged with the threaded shank 286 of the retaining bolt 282 and rotated in a first direction such that the nut 320 is caused to abut or otherwise cause the retaining washer 300 to be advanced towards the lower surface 220 of the support rail 212. As can be appreciated, the biasing element 290 causes the elongated head 284 of the retaining bolt 282 to be biased in a direction that is generally parallel to the longitudinal axis A-A (FIG. 36). As the nut 320 is further rotated in the first direction, the upturned flanges 304a, 304b, and 304c are caused to be compressed against the lower surface 220 of the support rail 212 and generally be deformed into a flattened shape (e.g., generally parallel to the lower surface 220 of the support rail 212). The compression of the upturned flanges 304a, 304b, and 304c causes the upturned flange 304d to protrude an increasing distance past the upper surface 216 of the support rail 212 and, with the elongated head 284 of the retaining bolt 282 rotated generally 90 degrees (e.g., forming a generally orthogonal angle relative to the longitudinal axis A-A), the upturned flange 304d is caused to abut or otherwise inhibit rotation of the elongated head 284 of the retaining bolt 282 back towards its original orientation (e.g., parallel to the longitudinal axis A-A) by the biasing element 290.

Figure 37:
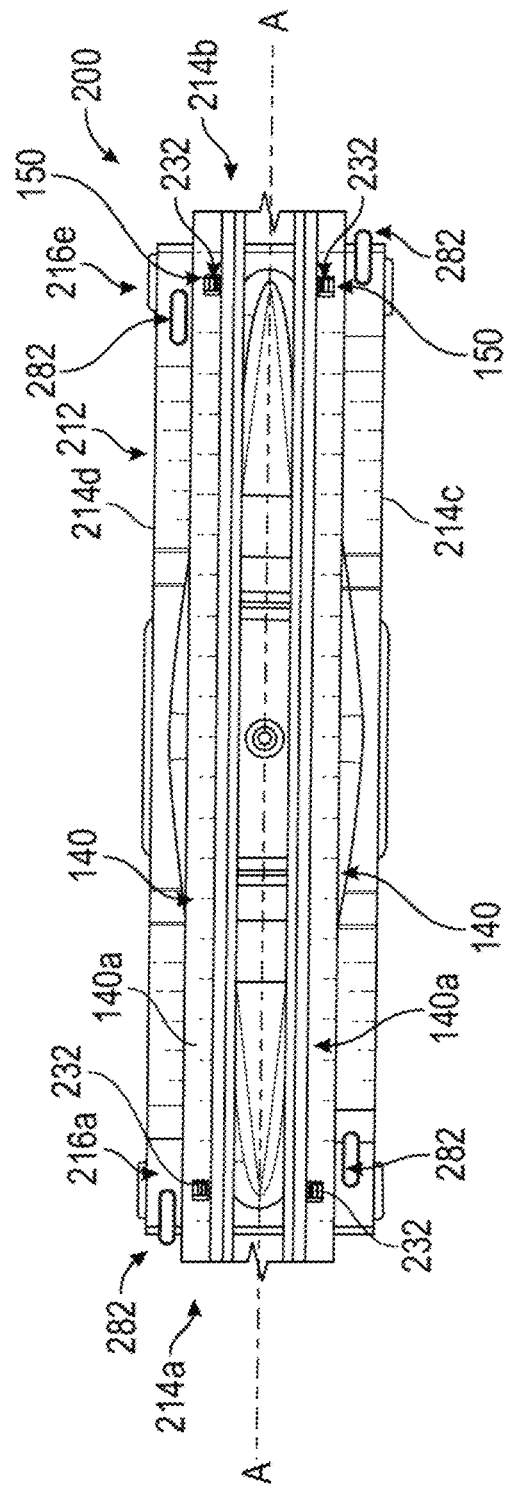
FIG. 37 is a plan view of the clamp assembly of FIG. 27 illustrating the clamp assembly placed in an initial, open position.
Figure 38:
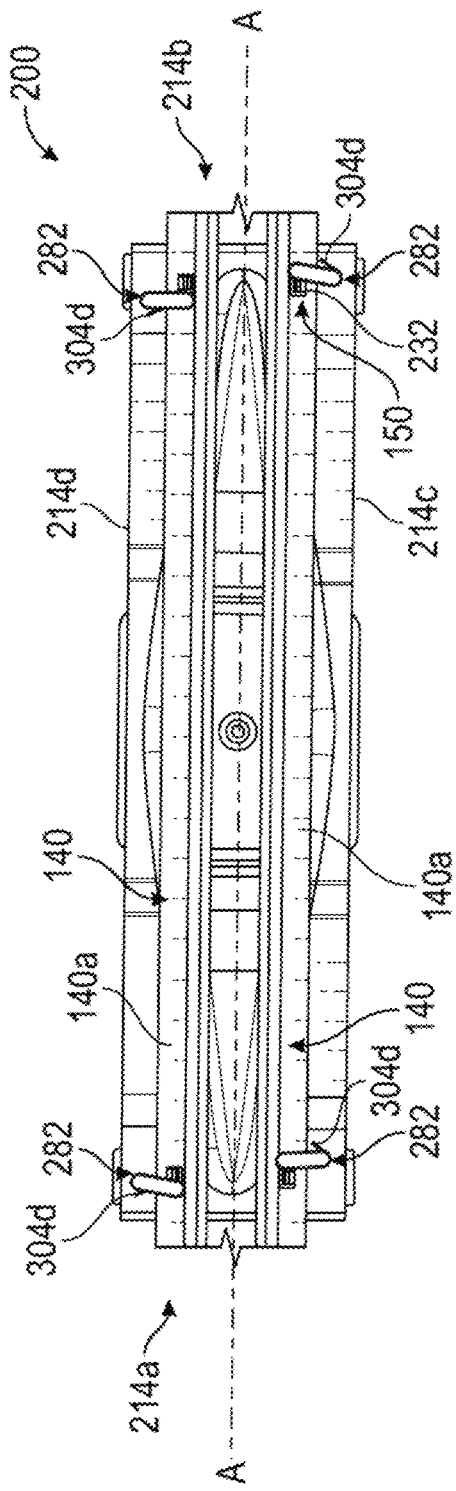
FIG. 38 is a plan view of the clamp assembly of FIG. 27 illustrating the clamp assembly placed in a second, clamped position.

With reference to FIGS. 36-38, in operation, the plurality of retaining bolts 282 is oriented in the initial, unlocked position (e.g., the elongated heads 284 are generally parallel with the longitudinal axis A-A). At this point, the solar module 140 is disposed over the support rail 212 such that a lower surface 140b of the support rail 140 abuts the upper surface 216 of the support rail and each of the upturned flanges 232 of the support rail are received within a corresponding bore 150 of the solar module to generally inhibit movement of the solar module 140 relative to the support rail 212 (FIGS. 36 and 37). With the lower surface 140b of the solar module 140 abutting the upper surface 216 of the support rail 212 and each of the upturned flanges 232 received within respective bores 150 of the solar module 140, the nuts 320 are caused to be rotated in a first direction, which causes the elongated heads 284 of each of the retaining bolts 282 to be rotated towards a center portion of the support rail 212 (e.g., away from each of the first and second opposed side surfaces 214c, 214d) until the outer surface 284a of the elongated head 284 abuts a portion of the upturned flange 232 to inhibit further rotation of the elongated head 284. With the elongated heads 284 abutting a portion of each upturned flange, the lower surface 284c of each of the elongated heads 284 is disposed over an upper surface 140a of the solar module 140 (FIG. 38).

Figure 39:
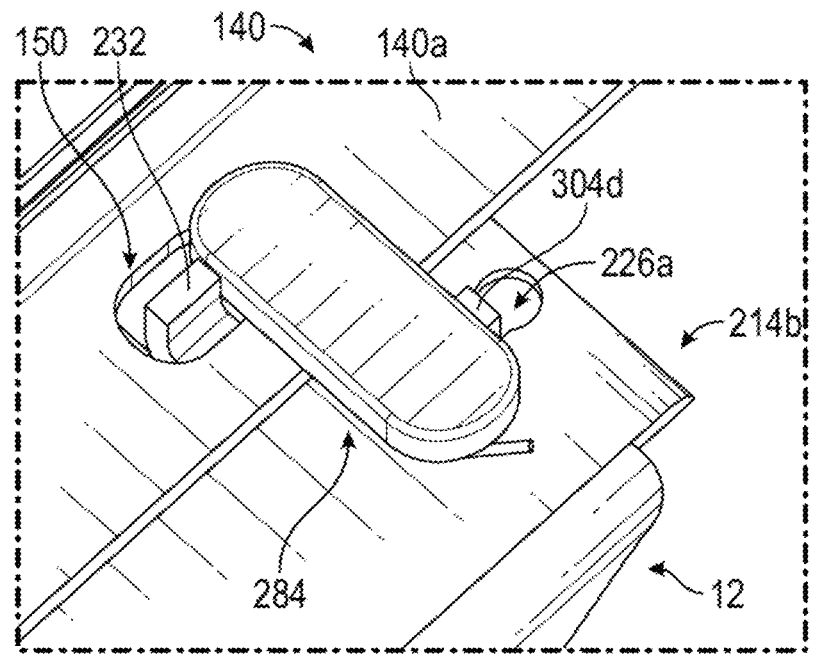
FIG. 39 is a perspective view of a solar module coupled to the clamp assembly of FIG. 27.
Figure 40:
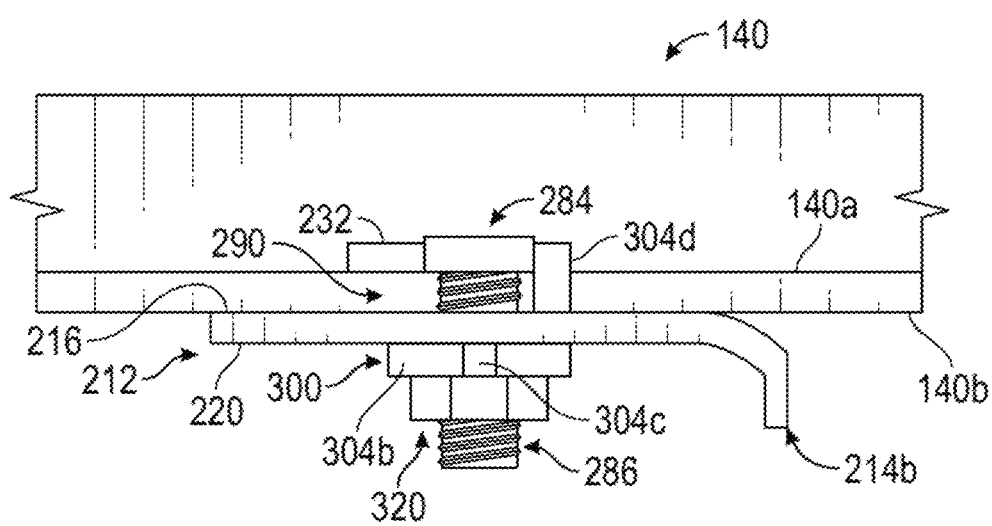
FIG. 40 is an elevation view of a solar module coupled to the clamp assembly of FIG. 27.

At this point, each of the nuts 320 is further rotated in the first direction to cause each of the upturned flanges 304a, 304b, and 304c of the retaining washer to be compressed against the lower surface 220 of the support rail and be to deformed or otherwise be flattened against the lower surface 220 shape (e.g., generally parallel to the lower surface 220 of the support rail 212). The compression of the upturned flanges 304a, 304b, and 304c causes the upturned flange 304d to protrude an increasing distance past the upper surface 216 of the support rail 212 and, with the elongated head 284 of the retaining bolt 282 rotated generally 90 degrees (e.g., forming a generally orthogonal angle relative to the longitudinal axis A-A), the upturned flange 304d is caused to abut or otherwise inhibit rotation of the elongated head 284 of the retaining bolt 282 back towards its original orientation (e.g., parallel to the longitudinal axis A-A) by the biasing element 290 (FIGS. 39 and 40). Continued rotation of the nuts 320 in the first direction causes the lower surfaces 284 of the retaining bolts 282 to compress against the upper surface 140a of the solar module and couple the solar module 140 to the support rail 212. As can be appreciated, the upturned flanges 232 and the upturned flanges 304d cooperate to inhibit rotation of the elongated heads 284 of each retaining bolt 282 in either a clockwise or counter-clockwise direction, inhibiting movement of the solar module 140 relative to the support rail 212.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A coupling system for use with a solar tracker, comprising:
   a support rail defining opposed top and bottom surfaces, the top surface configured to support a portion of a solar module;
   a fastening assembly operably coupled to a portion of the support rail, the fastening assembly including a retaining bolt having an elongated head including opposed top and bottom surfaces extending between opposed first and second end portions; and
   a spring arm operably coupled to the bottom surface of the support rail and including an upturned flange that is configured to extend past the top surface of the support rail,
   wherein the bottom surface of the elongated head is offset from the top surface of the support rail to define a gap, the gap configured to selectively receive a portion of a solar module therein,
   wherein a portion of the solar module includes a retaining groove defined therethrough, the retaining groove configured to receive a portion of the elongated head of the retaining bolt therein, and
   wherein a boss of the retaining bolt includes an outer dimension that permits the retaining bolt to slide within the retaining groove of the solar module from a first position, where a portion of the solar module is not received within the gap, to a second position where a portion of the solar module is received within the gap.

2. The coupling system according to claim 1, wherein the upturned flange of the spring arm is configured to be received within the retaining groove when the solar module is in the second position, such that the elongated head and the upturned flange cooperate to inhibit movement of the solar module relative to the support rail.

3. The coupling system according to claim 1, further comprising a biasing element, the biasing element interposed between the bottom surface of the elongated head and the top surface of the support rail to bias the elongated head away from the top surface of the support rail.

4. The coupling system according to claim 3, wherein the biasing element is configured to be compressed to adjust a distance between the bottom surface of the elongated head and the top surface of the support rail.

5. The coupling system according to claim 4, further comprising a nut threadably engaged to a portion of the retaining bolt, the nut configured to compress the biasing element when rotated in a first direction and enable the biasing element to extend when rotated in a second, opposite direction.

6. The coupling system according to claim 1, wherein the elongated head defines a racetrack profile.

7. A fastening assembly for use with a solar module, comprising:
   a retaining bolt, the retaining bolt including:
      an elongated head including opposed top and bottom surfaces extending between opposed first and second end portions; and
      a boss disposed on a portion of the bottom surface of the elongated head and disposed adjacent one of the first and second end portions; and
   a biasing element disposed adjacent the bottom surface of the elongated head,
   wherein the bottom surface of the elongated head is offset from a lower surface of the boss to define a gap, the gap configured to selectively receive a portion of the solar module therein,
   wherein a portion of the solar module includes a retaining groove defined therethrough, the retaining groove configured to receive a portion of the elongated head of the retaining bolt therein,
   wherein the boss of the retaining bolt includes an outer dimension that permits the retaining bolt to slide within the retaining groove of the solar module from a first position, where a portion of the solar module is not received within the gap, to a second position where a portion of the solar module is received within the gap, and
   wherein the biasing element is configured to be compressed to alter a dimension of the gap.

8. The fastening assembly according to claim 7, further comprising a spring arm, the spring arm configured to selectively engage a portion of the solar module.

9. The fastening assembly according to claim 7, wherein the boss extends from the bottom surface of the elongated head and terminates at the lower surface, the distance between the bottom surface of the elongated head and the lower surface of the boss defining the dimension of the gap.

10. The fastening assembly according to claim 7, wherein the elongated head defines a racetrack profile.

* * * * *